(12) United States Patent
Meng et al.

(10) Patent No.: US 11,543,915 B2
(45) Date of Patent: Jan. 3, 2023

(54) TOUCH DETECTION METHOD, TOUCH DETECTION DEVICE, AND TOUCH DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhaohui Meng, Beijing (CN); Wei Sun, Beijing (CN); Lin Cong, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/324,259

(22) Filed: May 19, 2021

(65) Prior Publication Data
US 2022/0066591 A1 Mar. 3, 2022

(30) Foreign Application Priority Data
Aug. 25, 2020 (CN) .......................... 202010876259.8

(51) Int. Cl.
*G06F 3/041* (2006.01)
*G06F 3/0354* (2013.01)
*G06F 3/044* (2006.01)

(52) U.S. Cl.
CPC ........ *G06F 3/0418* (2013.01); *G06F 3/04166* (2019.05); *G06F 3/03545* (2013.01); *G06F 3/044* (2013.01); *G06F 2203/04108* (2013.01)

(58) Field of Classification Search
CPC .............. G06F 3/0418; G06F 3/04166; G06F 3/03545; G06F 3/044; G06F 2203/04108
See application file for complete search history.

(56) References Cited

U.S. PATENT DOCUMENTS

| | | | |
|---|---|---|---|
| 2013/0100071 A1* | 4/2013 | Wright | G06F 3/0446 345/173 |
| 2013/0106716 A1* | 5/2013 | Sundara-Rajan | G06F 3/04162 345/173 |
| 2014/0028609 A1* | 1/2014 | Santos | G06F 3/0416 345/173 |
| 2014/0085232 A1* | 3/2014 | Ootani | G06F 3/0488 345/173 |

(Continued)

*Primary Examiner* — Hong Zhou
(74) *Attorney, Agent, or Firm* — Dority & Manning, P.A.

(57) ABSTRACT

A touch detection method includes: scanning a reference scan region according to a first control protocol to collect initial touch signals including an initial trigger signal; determining position information of a starting point according to the initial touch signals; reporting the position information of the starting point; switching the first control protocol to a second control protocol; and performing following operations at least once: determining a current target scan region, scanning the current target scan region according to the second control protocol to collect current touch signals including a current trigger signal, determining position information of a touch point according to the current touch signals, and reporting the position information of the touch point. An area of the current target scan region is less than an area of the reference scan region.

18 Claims, 14 Drawing Sheets

(56) References Cited

U.S. PATENT DOCUMENTS

2017/0255294 A1* 9/2017 Shepelev ............ G06F 3/04182
2018/0188882 A1* 7/2018 Kang .................. G06F 3/04166
2019/0212867 A1* 7/2019 Han ...................... G06F 3/0412

* cited by examiner

TOUCH DETECTION METHOD, TOUCH DETECTION DEVICE, AND TOUCH DISPLAY DEVICE

CROSS-REFERENCE TO RELATED APPLICATION

This application claims priority to Chinese Patent Application No. 202010876259.8, filed on Aug. 25, 2020, which is incorporated herein by reference in its entirety.

TECHNICAL FIELD

The present disclosure relates to the field of touch technologies, and in particular, to a touch detection method, a touch detection device and a touch display device.

BACKGROUND

As a simple, natural and fast human-computer interaction manner, the touch technology is increasingly used in the display field.

SUMMARY

In one aspect, a touch detection method is provided. The touch detection method includes: scanning a reference scan region according to a first control protocol to collect initial touch signals including an initial trigger signal; determining position information of a starting point according to the initial touch signals; reporting the position information of the starting point; switching the first control protocol to a second control protocol; and performing following operations at least once: determining a current target scan region, scanning the current target scan region according to the second control protocol to collect current touch signals including a current trigger signal, determining position information of a touch point according to the current touch signals, and reporting the position information of the touch point. An area of the current target scan region is less than an area of the reference scan region, and a geometric center point of the current target scan region is the starting point or a previous touch point determined in a previous scan.

In some embodiments, the initial trigger signal is generated in response to a trigger event.

In some embodiments, the trigger event includes a stylus hover or a gesture hover.

In some embodiments, the trigger event includes a stylus touch or a finger touch.

In some embodiments, performing following operations at least once: determining a current target scan region; scanning the current target scan region according to the second control protocol to collect the current touch signals; determining position information of a touch point according to the current touch signals, and reporting the position information of the touch point, includes: determining a first current target scan region by taking the starting point determined according to the initial touch signals as a geometric center point; scanning the first current target scan region according to the second control protocol to collect first current touch signals including a first current trigger signal; determining position information of a first touch point according to the first current touch signals; reporting the position information of the first touch point; determining a second current target scan region by taking the first touch point as a geometric center point; scanning the second current target scan region according to the second control protocol to collect second current touch signals including a second current trigger signal; determining position information of a second touch point according to the second current touch signals; reporting the position information of the second touch point; until determining an (N+1)-th current target scan region by taking an N-th touch point determined in an Nth current target scan region as a geometric center point, so as to collect (N+1)-th current touch signals including an (N+1) current trigger signal, N being an integer greater than or equal to 2; determining position information of an (N+1)-th touch point according to the (N+1)-th current touch signals; and reporting the position information of the (N+1)-th touch point.

In some embodiments, the touch detection method further includes: determining whether a scan duration for scanning the current target scan region is greater than a first threshold; if the scan duration is greater than the first threshold, switching the second control protocol to the first control protocol, and scanning the reference scan region according to the first control protocol to collect next initial touch signals including a next initial trigger signal.

In some embodiments, a frame time includes at least one scan period and a correction period after the at least one scan period; and a plurality of scans are performed in each scan period. The touch detection method further includes: determining a signal-to-noise ratio of at least one trigger signal collected in a current frame time within a correction period of the current frame time; determining whether the signal-to-noise ratio is greater than a second threshold; if the signal-to-noise ratio is less than or equal to the second threshold, correcting a number of scans in each scan period in a next frame time of the current frame time.

In some embodiments, the number of scans performed in each frame time is the same. The touch detection method further includes: in the correction period of the current frame time, determining whether a number of scans completed in the current frame time is equal to a number of scans performed in a previous frame time of the current frame time, and if the number of scans completed in the current frame time is less than the number of scans performed in the previous frame time, continuing to perform a scan according to a current first control protocol or second control protocol in the correction period of the current frame time, so as to correct the number of scans in the current frame time.

In some embodiments, a scan is performed according to the second control protocol in the current frame time. The touch detection method further includes: in the correction period of the current frame time, determining whether a number of actual reports of position information in the current frame time is less than a third threshold, if the number of actual reports is less than the third threshold, continuing to perform the scan according to the second control protocol in the correction period in the current frame time, and reporting position information of a corresponding touch point to correct the number of actual reports in the current frame time.

In another aspect, a touch detection device is provided. The touch detection device includes a plurality of signal collectors and a microcontroller. The microcontroller is coupled to the plurality of signal collectors. The plurality of signal collectors are configured to scan touch sensors in a reference scan region according to a first control protocol to collect initial touch signals including an initial trigger signal. The microcontroller is configured to determine position information of a starting point according to the initial touch signals, report the position information of the starting point, and switch the first control protocol to a second control protocol. The plurality of signal collectors and the microcontroller are further configured to perform following operations at least once: determining a current target scan region; scanning touch sensors in the current target scan region according to the second control protocol to collect current touch signals including a current trigger signal; determining position information of a touch point according to the current touch signals, and reporting the position information of the touch point. An area of the current target scan region is less than an area of the reference scan region, and a geometric center point of the current target scan region is the starting point or a previous touch point that is determined in a previous scan.

In some embodiments, the microcontroller is configured to send a first control instruction to signal collectors corresponding to the reference scan region according to the first control protocol, send a second control instruction to signal collectors corresponding to the current target scan region according to the second control protocol, determine the position information of the starting point according to the initial touch signals, report the position information of the starting point, switch the first control protocol to the second control protocol, determine the position information of the touch point according to the current touch signals and report the position information of the touch point. Each signal collector is configured to be coupled to at least one touch sensor. The signal collectors corresponding to the reference scan region are configured to scan touch sensors in the reference scan region according to the first control instruction to obtain the initial touch signals, and transmit the initial touch signals to the microcontroller. The signal collectors corresponding to the current target scan region are configured to scan touch sensors in the current target scan region according to the second control instruction to obtain the current touch signals, and transmit the current touch signals to the microcontroller In some embodiments, the signal collector includes an analog-to-digital converter and an active front end circuit. The analog-to-digital converter is coupled to the microcontroller. The active front end circuit is coupled to the analog-to-digital converter and the microcontroller.

In some embodiments, the touch detection device further includes at least one multiplexer. A signal collector is configured to be coupled to part of a plurality of touch sensors through one multiplexer.

In another aspect, a touch detection device is provided. The touch detection device includes a memory and a processor. The processor is coupled to the memory. The memory stores one or more computer programs. The processor is configured to execute the one or more computer programs to cause the touch detection device to implement the touch detection method according to any of the above embodiments.

In yet another aspect, a touch display device is provided. The touch display device includes: a plurality of touch sensors, the touch detection device as described in any of the above embodiments and a host. The touch detection device is coupled to the plurality of touch sensors. The host is coupled to the touch detection device. The host is configured to receive position information of the starting point or the touch point reported by the touch detection device.

In some embodiments, the touch display device further includes a display panel. The display panel is coupled to the touch detection device. The plurality of touch sensors are disposed in the display panel. The touch detection device is configured to receive touch signals including a trigger signal generated according to a trigger event performed on the display panel.

In some embodiments, the touch display device further includes an image generator and a screen driving board. The image generator is coupled to the touch detection device. The screen driving board is coupled to the image generator and the display panel. The image generator is configured to receive and process position information of a touch point from the touch detection device to generate image information. The screen driving board is configured to transmit data signals to the display panel according to the image information. The display panel is configured to display an image according to the data signals.

In some embodiments, each signal collector is coupled to a respective one of the plurality of touch sensors.

In yet another aspect, a non-transitory computer-readable storage medium is provided. The non-transitory computer-readable storage medium stores a computer program that, when executed by a touch display device, causes the touch display device to implement the touch detection method as described in any of the above embodiments.

BRIEF DESCRIPTION OF THE DRAWINGS

In order to describe technical solutions in the present disclosure more clearly, accompanying drawings to be used in some embodiments of the present disclosure will be briefly introduced. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
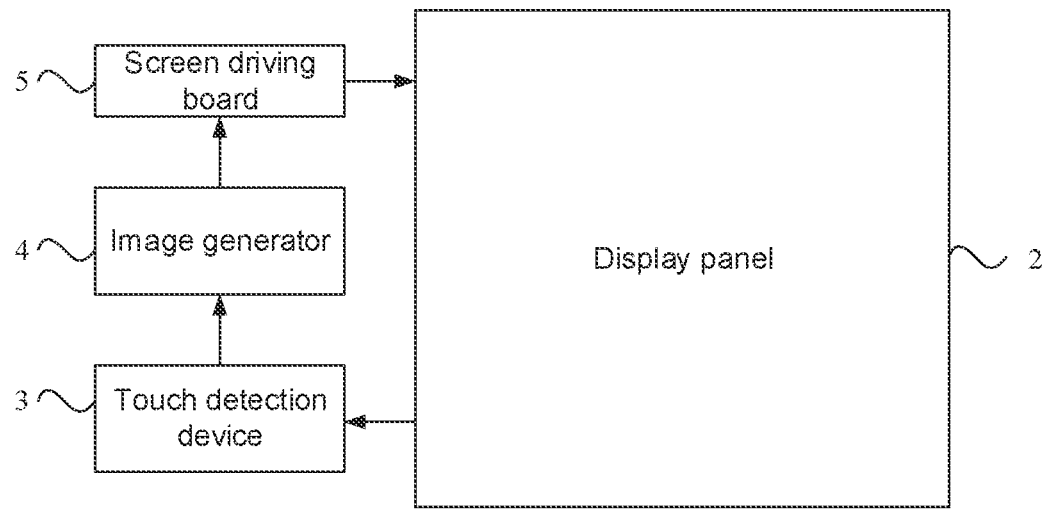
FIG. 1 is a block diagram of a touch display device, in accordance with some embodiments.

The technical solutions in some embodiments of the present disclosure will be described clearly and completely with reference to the accompanying drawings. However, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "included, but not limited to." In the description, the terms such as "one embodiment," "some embodiments," "exemplary embodiments," "example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Terms such as "first" or "second" are only used for descriptive purposes and are not to be construed as indicating or implying the relative importance or implicitly indicating the number of indicated technical features below. Thus, features defined as "first" or "second" may explicitly or implicitly include one or more of the features. In the description of the embodiments of the present disclosure, "a plurality of" or "the plurality of" or "multiple" means two or more unless otherwise specified.

Some embodiments may be described using the expression "coupled" and "connected" along with their derivatives. For example, the term "connected" may be used when describing some embodiments to indicate that two or more components are in direct physical touch point or electrical touch point with each other. As another example, term "coupled" may be used in the description of some embodiments to indicate that two or more components are in direct physical or electrical contact. The term "coupled" may also mean that two or more elements are not in direct contact with each other, but yet still cooperate or interact with each other. The embodiments disclosed herein are not necessarily limited to the content herein.

"A and/or B" includes the following three combinations: only A, only B, and a combination of A and B.

As used herein, the term "if" is optionally construed as "when" or "in a case where" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The use of "configured to" herein is meant as open and inclusive language that does not foreclose devices adapted to or configured to perform additional tasks or steps.

The term "approximately" as used herein is inclusive of a stated value and an average value within an acceptable range of deviation of a particular value. The acceptable range of deviation is determined by a person of ordinary skill in the art in view of the measurement in question and the error associated with a particular amount of measurement (i.e., the limitations of the measurement system).

The exemplary embodiments are described herein with reference to cross-sectional views and/or plan views as idealized exemplary drawings. In the drawings, thicknesses of layers and regions may be exaggerated for clarity. Therefore, variations in shapes with respect to the drawings due to, for example, manufacturing techniques and/or tolerances are conceivable. Therefore, the exemplary embodiments should not be construed as being limited to the shapes of the regions shown herein, but include shape deviations due to, for example, manufacturing. For example, an etched region that is shown to have a rectangular shape generally has a curved feature. Therefore, the regions shown in the drawings are schematic in nature, and their shapes are not intended to show the actual shapes of the regions of the devices, and are not intended to limit the scope of the exemplary embodiments.

A touch display device is a display device that adopts touch technology, in which a touch panel is provided with touch sensors (e.g., touch electrodes). According to positions of the touch sensors in the touch panel, touch panels may be classified into three types: out-cell touch panels, on-cell touch panels, and in-cell touch panels. For example, since common electrodes may also be used as touch electrodes in the in-cell touch panel, and a time-division multiplex manner is used for realizing touch and display functions (that is, the touch function and the display function are on a same time axis), the in-cell touch panel has advantages of low cost, lightness, thinness and the like.

However, due to the limitation of the time axis and data processing and transmission, the in-cell touch panel has a relatively long touch response duration (for example, greater than 30 ms). Therefore, when operations such as fast flicking, writing, drawing a circle and the like are performed on the in-cell touch panel, poor followability of a touch display image and poor image effect may occur.

For example, the in-cell touch panel may be a capacitive touch panel. The capacitive touch panel may include a plurality of touch electrodes spaced apart, and a touch chip (i.e., a touch IC) coupled to the plurality of touch electrodes. For example, a touch electrode and the ground may constitute a capacitor, or two touch electrodes may constitute a capacitor. In this way, when a finger or a stylus touches the touch panel, the capacitance of the capacitor corresponding to the touched position in the touch panel will change. The touch chip may determine position information of a touch point by detecting the change of the capacitance of each capacitor, and report the position information of the touch point to a host terminal, thereby achieving related touch functions. The host terminal may be, for example, a central processing unit (CPU) or an image generator (e.g., a graphics processing unit, GPU for short), etc.

In a process of determining the position information of the touch point, it is generally necessary to perform at least one full-screen scan, In this way, an amount of data (or the number of signals) that needs to be scanned, processed, and transmitted in a touch process will be relatively large, and the response duration will be relatively long. For example, for the in-cell touch panel (with touch and display functions being on the same time axis), the time for touch detection in each frame time needs to be relatively short, which may lead to a decrease in a point reporting rate. As a result, it may be difficult to obtain a good touch effect.

Some embodiments of the present disclosure provide a touch display device. The touch display device may be a liquid crystal display (LCD) device or a self-luminescent display device. The self-luminescent display device may be, for example, an organic light-emitting diode (OLED) display device, a quantum dot light-emitting diode (QLED) display device, or a light-emitting diode (LED) display device.

In addition, the touch display device may be a display device including an out-cell touch panel, an in-cell touch panel or an on-cell touch panel, depending on the configuration of the touch structure of the touch display device. When the touch display device is a liquid crystal display device, the touch display device may include the on-cell touch panel or the in-cell touch panel. For example, the touch display device may be a liquid crystal display device including an in-cell touch panel.

Figure 2:
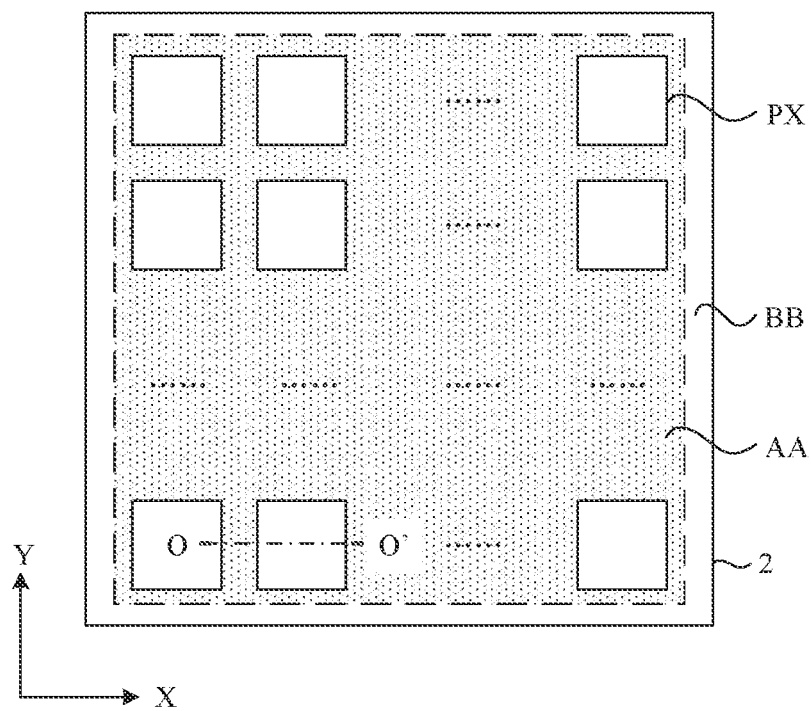
FIG. 2 is a schematic diagram of a touch display device, in accordance with some embodiments.

In some embodiments, as shown in FIG. 1, the touch display device 01 includes a display panel 2. Referring to FIG. 2, the display panel 2 may have a display area AA and a peripheral region BB located on at least one side of the display area AA. For example, the peripheral region BB surrounds the display area AA.

The display panel 2 may be a liquid crystal display panel, or a self-luminescent display panel (e.g., an OLED display panel).

Figure 3:
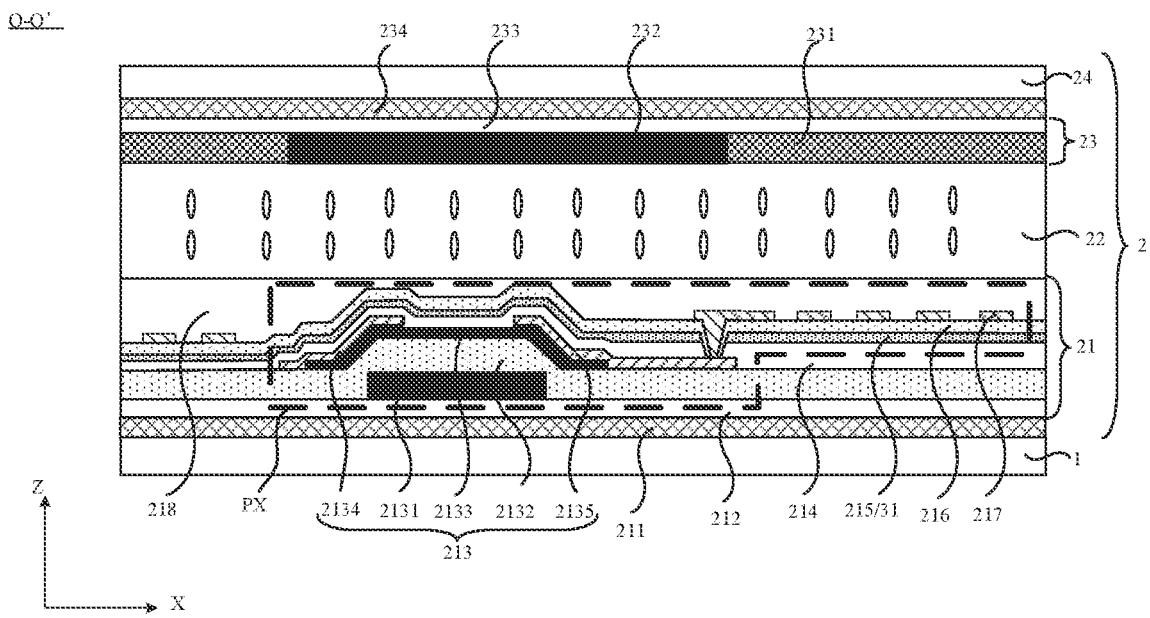
FIG. 3 is a sectional view of the touch display device shown in FIG. 2 taken along the O-O' direction.

In some embodiments, referring to FIG. 3, the display panel 2 is a liquid crystal display panel. The display panel 2 includes an array substrate 21, an opposite substrate 23, and a liquid crystal layer 22 located between the array substrate 21 and the opposite substrate 23.

In some examples, as shown in FIGS. 2 and 3, the array substrate 21 includes a first base 212 and a plurality of sub-pixels PX disposed in the display area AA on the first base 212. The plurality of sub-pixels PX may include sub-pixels of a first color, sub-pixels of a second color, and sub-pixels of a third color. The first color, the second color and the third color may be three primary colors, for example, red, green, and blue, respectively.

For example, as shown in FIG. 2, the plurality of sub-pixels PX are arranged in an array. Sub-pixels FX arranged in a line along a first direction X may be regarded as sub-pixels in a same row, and sub-pixels PX arranged in a line along a second direction Y may be regarded as sub-pixels in a same column. The first direction X and the second direction Y are both parallel to a plane where a surface of the first base 212 facing the sub-pixels PX is located, and the first direction X and the second direction Y intersect. For example, the first direction X and the second direction Y are perpendicular to each other.

As shown in FIG. 3, a third direction Z is perpendicular to the plane that the first direction X and the second direction Y defines, and the third direction Z may be regarded as a thickness direction of the first base 212. The array substrate 21 and the opposite substrate 23 are arranged opposite to each other along the third direction Z.

As shown in FIG. 3, the sub-pixel PX may include a pixel circuit and a pixel electrode 217 coupled to the pixel circuit. The pixel circuit may include one or more thin film transistors. It will be noted that, for the convenience of description, FIG. 3 only illustrates one thin film transistor 213 in the pixel circuit.

As shown in FIG. 3, the thin film transistor 213 includes a gate 2131, a portion of a gate insulating layer 2132, an active layer 2133, a source 2134, and a drain 2135. According to a relative positional relationship between the gate 2131 and the active layer 2133, the thin film transistor 213 may be a top gate, bottom gate, or double-gate thin film transistor.

For example, as shown in FIG. 3, the gate 2131 is located at a side of the active layer 2133 proximate to the first base 212. The gate insulating layer 2132 is located between the gate 2131 and the active layer 2133. In this case, the thin film transistor 213 is a bottom gate thin film transistor. The source 2134 and the drain 2135 are located on a side of the active layer 2133 away from the first base 212, and are coupled to the active layer 2133.

For example, the pixel electrode 217 is coupled to one of the source 2134 and the drain 2135 of the thin film transistor 213 in the pixel circuit in the sub-pixel PX.

In some examples, as shown in FIG. 3, the array substrate 21 further includes a first insulating layer 214 disposed on a side of the sources 2134 and the drains 2135 away from the first base 212, common electrodes 215 disposed on a side of the first insulating layer 214 away from the thin film transistors 213, a second insulating layer 216 disposed on a side of the common electrodes 215 away from the first insulating layer 214, and between the common electrodes 215 and the pixel electrodes 217, and a planarization layer 218 disposed between the pixel electrodes 217 and the liquid crystal layer 22. For example, the pixel electrode 217 is coupled to one of the source 2134 and the drain 2135 in the thin film transistor 213 through a via hole passing through the first insulating layer 214 and the second insulating layer 216.

It will be noted that, positions of the common electrodes 215 may be designed according to actual conditions. That is, an arrangement of the common electrodes 215 is not limited to the arrangement in the above embodiments, and other arrangements are also possible. For example, the common electrodes 215 and the pixel electrodes 217 are both located in the array substrate 21, the pixel electrodes 217 and the common electrodes 215 may be disposed in different layers, and the common electrodes 215 are closer to the liquid crystal layer 22 than the pixel electrodes 217. In this case, the common electrodes 215 may be connected, so that they are constitute a whole layer of film. Or, the pixel electrodes 217 and the common electrodes 215 may be disposed in a same layer. That is, they are included in the same layer. In this case, the pixel electrode 217 and the common electrode 215 both have, for example a comb structure including a plurality of strip-shaped sub-electrodes. As another example, the common electrodes 215 are included in the opposite substrate 23.

In some examples, as shown in FIG. 3, the opposite substrate 23 includes a second base 233 and a color filter layer 231 disposed on a side of the second base 233 proximate to the liquid crystal layer 22. In this case, the opposite substrate 23 may also be referred to as a color filter (OF) substrate. For example, the color filter layer includes photoresist units of a first color, photoresist units of a second color, and photoresist units of a third color. The photoresist units of the first color may correspond to the sub-pixels of the first color, the photoresist units of the second color may correspond to the sub-pixels of the second color, and the photoresist units of the third color may correspond to the sub-pixels of the third color. The opposite substrate 23 may further include a black matrix 232 disposed on the second base 233. The black matrix 232 may separate the photoresist units of the first color, the photoresist units of the second color, and the photoresist units of the third color.

In some examples, as shown in FIG. 3, the display panel 2 further includes a first polarizing element 211 disposed on a side of the array substrate 21 away from the liquid crystal layer 22, and a second polarizing element 234 disposed on a side of the opposite substrate 23 away from the liquid crystal layer 22. Both the first polarizing element 211 and the second polarizing element 234 may change a polarization direction of light. For example, the first polarizing element 211 and the second polarizing element 234 are each an optical element with a polarization function, such as a polarizer or a metal grating. For example, a transmission axis of the first polarizing element 211 and a transmission axis of the second polarizing element 234 may be perpendicular to or parallel to each other.

In some examples, as shown in FIG. 3, the display panel 2 further include a cover plate 24 disposed on the side of the opposite substrate 23 away from the liquid crystal layer 22. For example, the cover plate 24 is located on a side of the second polarizing element 234 away from the liquid crystal layer 22. The cover plate 24 is, for example, a glass cover plate.

In some examples, as shown in FIG. 3, the touch display device 01 further includes a backlight module 1 disposed on the side of the array substrate 21 away from the liquid crystal layer 22. The backlight module 1 is configured to provide light to the display panel 2.

In some embodiments, referring to FIG. 1, the touch display device 01 further includes a touch detection device 3, an image generator 4, and a screen driving board 5. For example, the screen driving board 5 includes a timing controller (TOON). The touch detection device 3 is coupled to the display panel 2 and the image generator 4. The image generator 4 is further coupled to the screen driving board 5. The screen driving board 5 is further coupled to the display panel 2.

The touch detection device 3 is configured to collect touch signals, determine position information of a touch point according to the touch signals, and transmit the position information of the touch point to the image generator 4. The image generator 4 is configured to process the received position information of the touch point to generate image information, and transmit the image information to the screen driving board 5. The screen driving board is configured to transmit data signals (e.g., data voltages Vdata) to the display panel 2 according to the image information. The display panel 2 is configured to display an image according to the data signals.

For example, the user uses a stylus (e.g., an active stylus or a passive stylus, etc.) or a finger to perform an operation (e.g., drawing) on the display panel 2 (i.e., a touch screen) of the touch display device 01. In the process of user operation, the touch detection device 3 collects touch signals in real time, the touch signals may include a plurality of touch signals triggered by the stylus or the finger. Then the touch detection device 3 determines position information of touch points according to the touch signals, and transmits the position information of the touch points to the image generator 4. The image generator 4 generates image information of the touch points according to the received position information of the touch points, and integrates the image information of the touch points with background image information to generate touch image information. After that, the image generator 4 transmits the touch image information to the screen driving board 5. The screen driving board 5 generates data signals (e.g., data voltages Vdata) according to the received touch image information, and transmits the data signals to the display panel 2. The display panel 2 displays a touch image according to the data signals. For example, the touch image is an image that shows a trajectory, including the touch points, of the stylus or finger. Of course, the touch image may include only one touch point.

Figure 4:
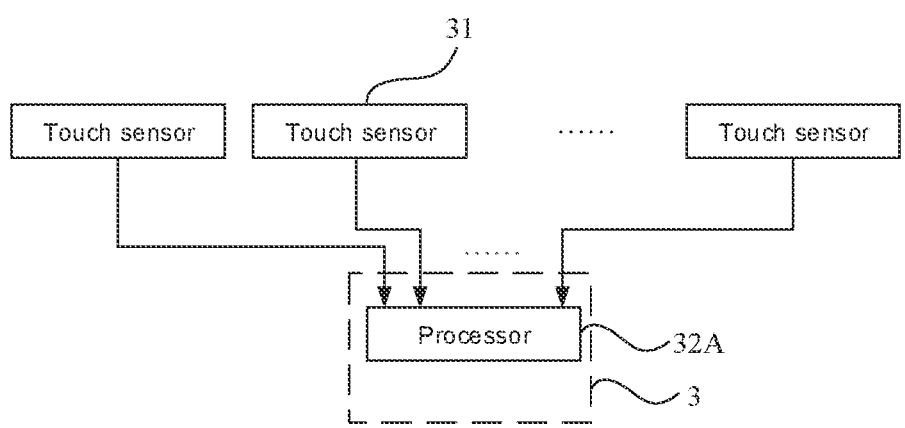
FIG. 4 is a block diagram of another touch display device, in accordance with some embodiments.

In some embodiments, referring to FIG. 4, the touch display device 01 includes a plurality of touch sensors 31. The touch sensor 31 may be a device with signal sensing function, such as a touch electrode.

In some embodiments, referring to FIG. 3, the common electrode 215 in the display panel 2 is also used as a touch electrode (i.e., the touch sensor 31). In this case, a common electrode layer including the common electrodes 215 in the display panel 2 is a patterned layer. That is, the common electrode layer includes a plurality of common electrodes 215 distributed in the display panel 2, and each common electrode 215 corresponds to at least one pixel electrode 217.

Figure 16A:
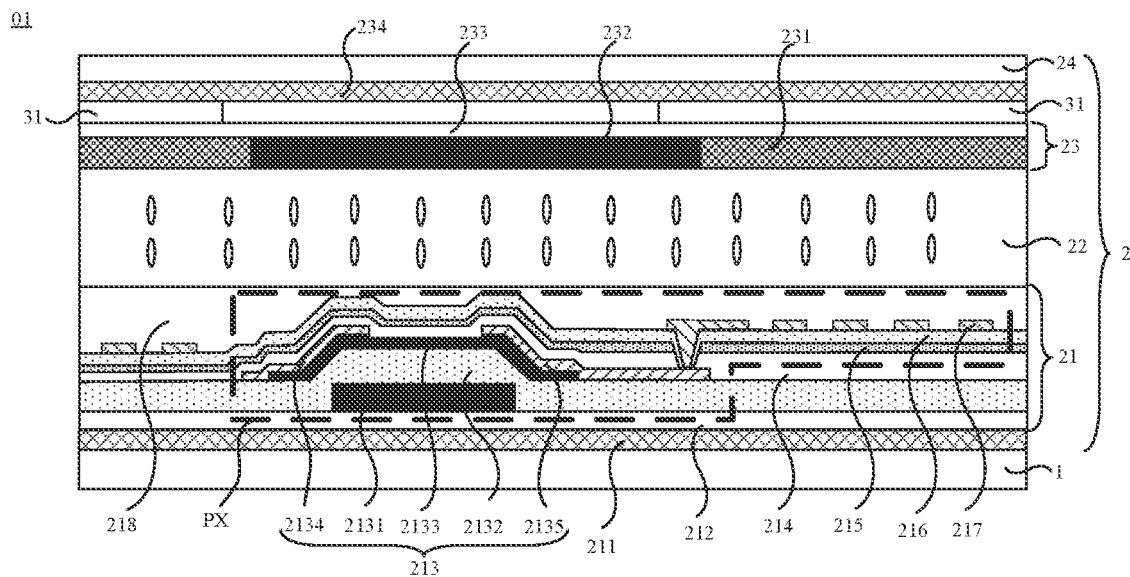
FIG. 16A is a sectional view of a part of a touch display device, in accordance with some embodiments.
Figure 16B:
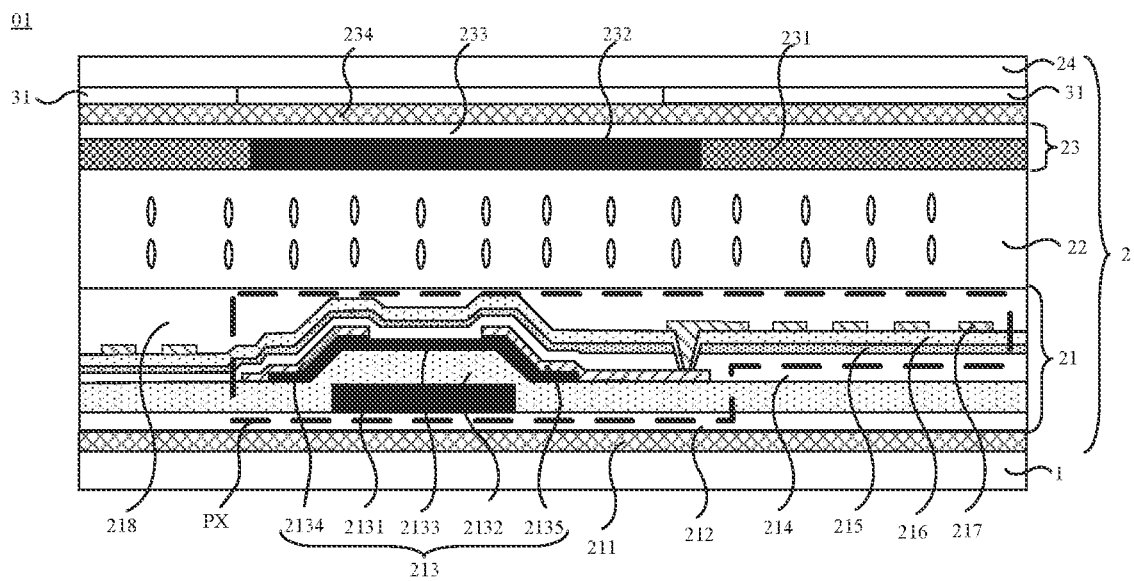
FIG. 16B is a sectional view of a part of another touch display device, in accordance with some embodiments.
Figure 17A:
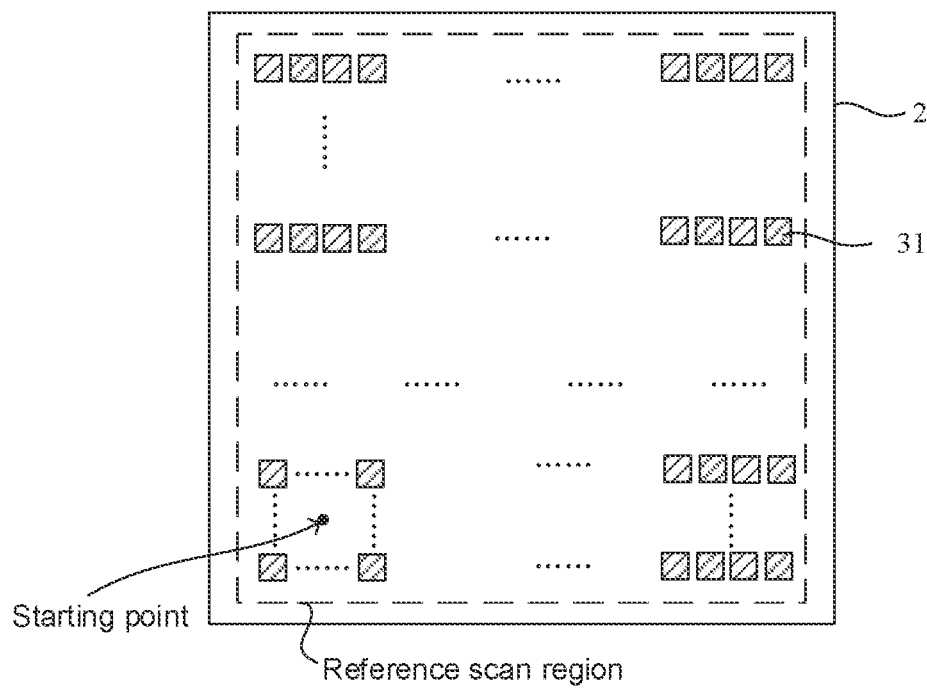
FIGS. 17A to 17D are schematic diagrams illustrating processes of a touch detection method, in accordance with some embodiments.
Figure 17B:
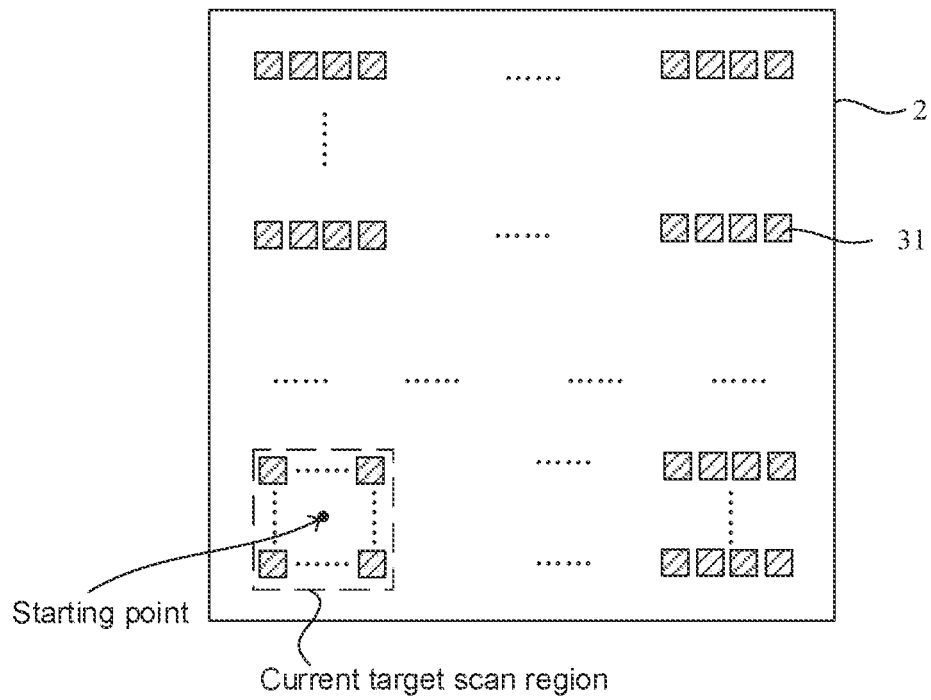
Figure 17C:
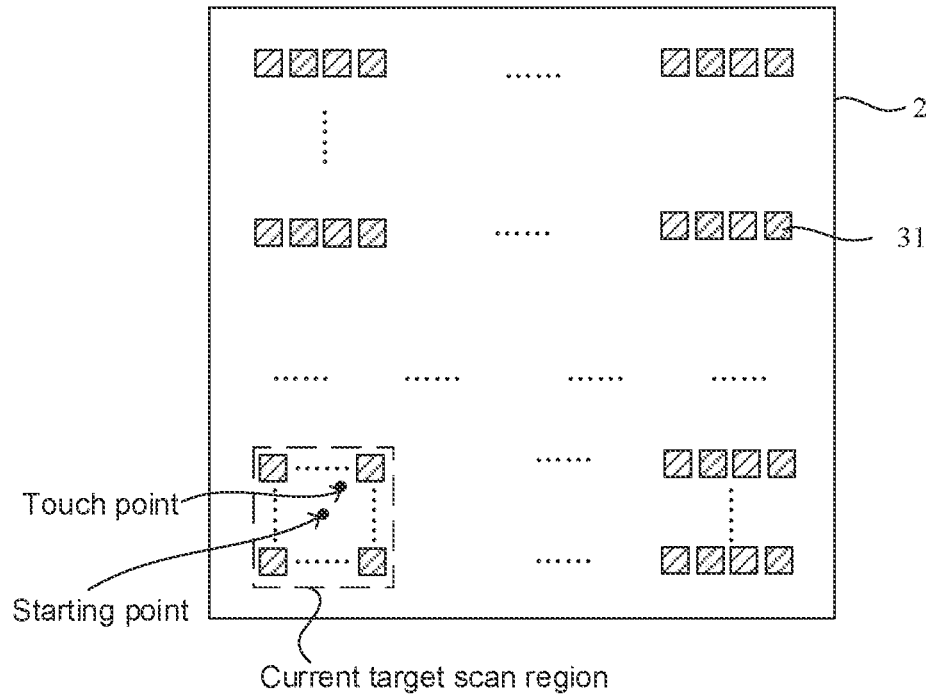
Figure 17D:
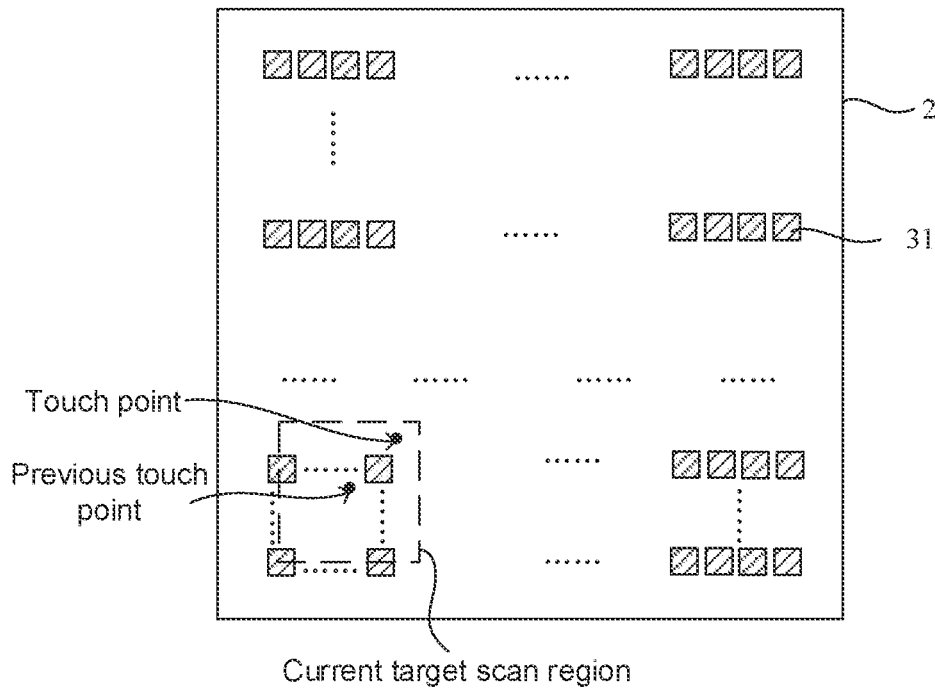

In some other embodiments, referring to FIG. 16A, the plurality of touch sensors 31 are provided between the second polarizing element 234 and the opposite substrate 23 (e.g., the second base 233). In some other embodiments, referring to FIG. 16B, the plurality of touch sensors 31 are provided between the cover plate 24 and the second polarizing element 234.

In some embodiments, the plurality of touch sensors 31 are configured to collect touch signals (e.g., signals that may indicate changes of capacitance).

In some embodiments, referring to FIG. 4, the touch detection device 3 includes a processor 32A. The processor 32A is coupled to the plurality of touch sensors 31.

In some embodiments, the processor 32A is configured to: scan touch sensors 31 in a reference scan region according to a first control protocol to collect initial touch signals including an initial trigger signal (i.e., receive the initial touch signals from the touch sensors 3 in the reference scan region); determine position information of a starting point according to the initial touch signals; report the position information of the starting point; and switch the first control protocol to a second control protocol. The processor 32A is further configured to perform following operations at least once: determining a current target scan region; scanning the current target scan region according to the second control protocol to collect current touch signals including a current trigger signal; determining position information of a touch point according to the current touch signals; and reporting the position information of the touch point. An area of the current target scan region is less than an area of the reference scan region, and a geometric center point of the current target scan region is the starting point or a previous touch point determined in a previous scan.

Figure 15:
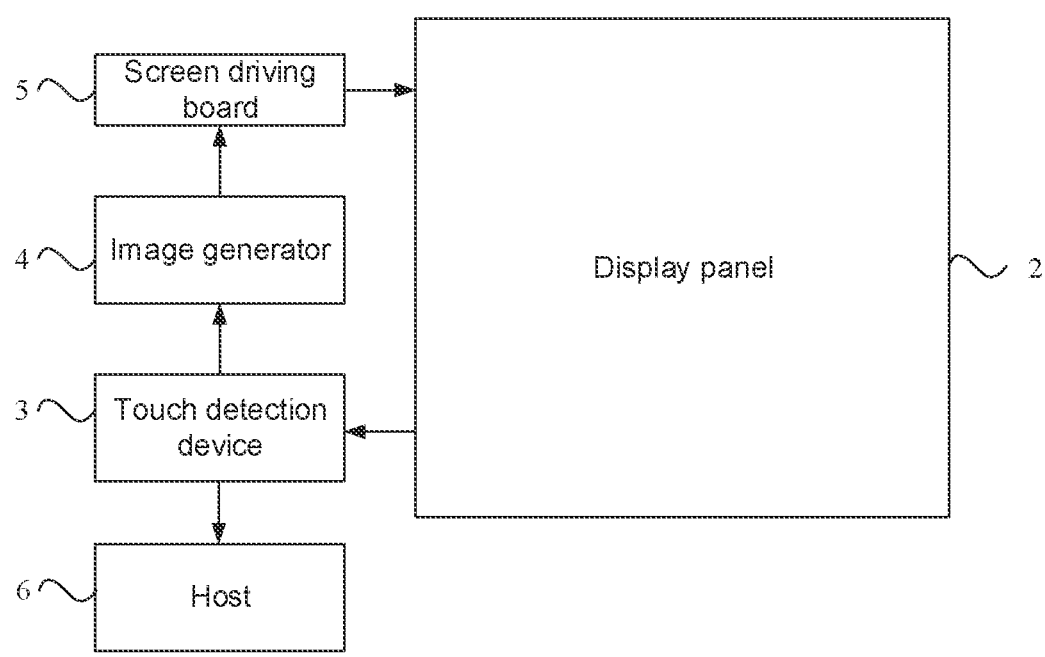
FIG. 15 is a block diagram of yet another touch display device, in accordance with some embodiments.

In some embodiments, referring to FIG. 15, the touch display device 01 further includes a host 6. The touch detection device 3 is coupled to the host 6. The host 6 is configured to receive the position information of the starting point or the touch point reported by the touch detection device 3.

For example, the above first control protocol is different from the second control protocol. In a case where the first control protocol is followed, the processor 32A may collect the initial touch signals corresponding to the reference scan region, determine position information of the starting point according to the initial touch signals, report the position information of the starting point and switch the first control protocol to the second control protocol. In a case where the second control protocol is followed, the processor 32A may collect the current touch signals corresponding to the current target scan region, determine the position information of the touch point according to the current touch signals, and report the position information of the touch point, The first control protocol and the second control protocol will be described below by examples.

Since the area of the target scan region is less than the area of the reference scan region, and a geometric center point of the target scan region is the starting point or a previous touch point determined by the processor 32A in the previous scan, an amount of data (or the number of signals) corresponding to scanning performed when the second control protocol is followed, subsequent processing, and transmission during a point reporting is less than an amount of data (or the number of signals) corresponding to scanning performed when the first control protocol is followed, subsequent processing, and transmission during a point reporting, In this way, the touch response time of the touch display device may be effectively shortened, thereby effectively improving a point reporting rate of the touch display device.

For example, the touch detection device 3 first collects initial touch signals including an initial trigger signal from touch sensors 31 (i.e., receives initial touch signals from the touch sensors 31) in a reference scan region (i.e., a wider scan region) according to the first control protocol (i.e., a control protocol with a slightly slower touch response speed), After obtaining the initial touch signals, the touch detection device 3 switches the first control protocol to the second control protocol (i.e., a control protocol with a faster touch response speed), and then collects current touch signals including a current trigger signal from touch sensors 31 in a current target scan region (i.e., a smaller scan region) according to the second control protocol. In this way, after the initial touch signals are obtained, reporting speeds of the touch detection device 3 to the starting point and subsequent touch points in the touch process may be greatly improved. That is, point reporting rate may be effectively enhanced, thereby effectively improving the touch effect of the touch display device. For example, the line followability in the process of drawing through touch may be enhanced, For example, the trigger signal includes an initial trigger signal or a current trigger signal. The trigger signal may be generated in a variety of ways. For example, the trigger signal is generated in response to a trigger event. For example, the touch detection device 3 may collect a trigger signal according to a trigger event performed on the display panel 2.

For example, the trigger event may include a hover event, or a touch event. That is, the trigger signal is generated in response to the touch event or the hover event.

For example, the touch event includes a stylus touch or a finger touch, etc. The "touch" refers to a state in which the stylus or finger touches the display panel 2 (i.e., the touch screen).

For example, the hover event includes a stylus hover or a gesture hover, etc. The "hover" refers to a state in which the stylus or finger approaches the display panel 2 (i.e., the touch screen) to be within a certain distance without touching the display panel 2 (i.e., the touch screen). In this way, the touch detection device 3 may obtain a trigger signal earlier, and advance the time of reporting the starting point in a current task accordingly, which may be regarded as predicting the starting point of the touch event, thereby further improving the touch effect of the touch display device 01, for example, further improving the line followability in the process of drawing a picture through touch.

It will be noted that, for the hover event, the distance range between the stylus or finger and the display panel 2 (i.e., the touch screen) may be selected and determined according to actual needs, which will not be limited in the embodiments of the present disclosure.

If the distance range is preset too large, a signal-to-noise ratio of the obtained initial trigger signal will be reduced, which may easily lead to a decrease in accuracy of prediction. Therefore, the distance range will not be too large. For example, in order to ensure the accuracy of the position information of the starting point, it may be considered that the hover event is met when the distance between the stylus or finger and the display panel 2 (i.e., the touch screen) is within a small distance range. The distance range is, for example, greater than 0 mm and less than or equal to 2 mm, such as 0.5 mm, 1 mm, 1.5 mm, or 2 mm.

The processor 32A has functions as described above, and the specific structure thereof may be various. In some examples, referring to FIG. 5, the processor 32A includes a microcontroller 322 and a plurality of signal collectors 321. The microcontroller 322 is coupled to the plurality of signal collectors 321. Each signal collector 321 is coupled to at least one touch sensor 31. For example, each signal collector 321 is coupled to multiple touch sensors 31. For another example, each signal collector 321 is coupled to a respective one of the plurality of touch sensors 31.

The microcontroller 322 is configured to send a first control instruction to signal collectors 321 corresponding to the reference scan region according to the first control protocol; send a second control instruction to signal collectors 321 corresponding to the current target scan region according to the second control protocol; determine and report the position information of the starting point according to the initial touch signals; switch the first control protocol to the second control protocol; and determine and report the position information of the touch point according to the current touch signals.

The signal collectors 321 corresponding to the reference scan region are configured to scan touch sensors 31 (i.e., receive initial touch signals including an initial trigger signal from the touch sensors 31) in the reference scan region according to the first control instruction, and transmit the obtained initial touch signals to the microcontroller 322. The signal collectors 321 corresponding to the current target scan region are configured to scan the touch sensors 31 (i.e., receive current touch signals including a current trigger signal from the touch sensors 31) in the current target scan region according to the second control instruction; and transmit the current touch signals to the microcontroller 322.

Figure 7:
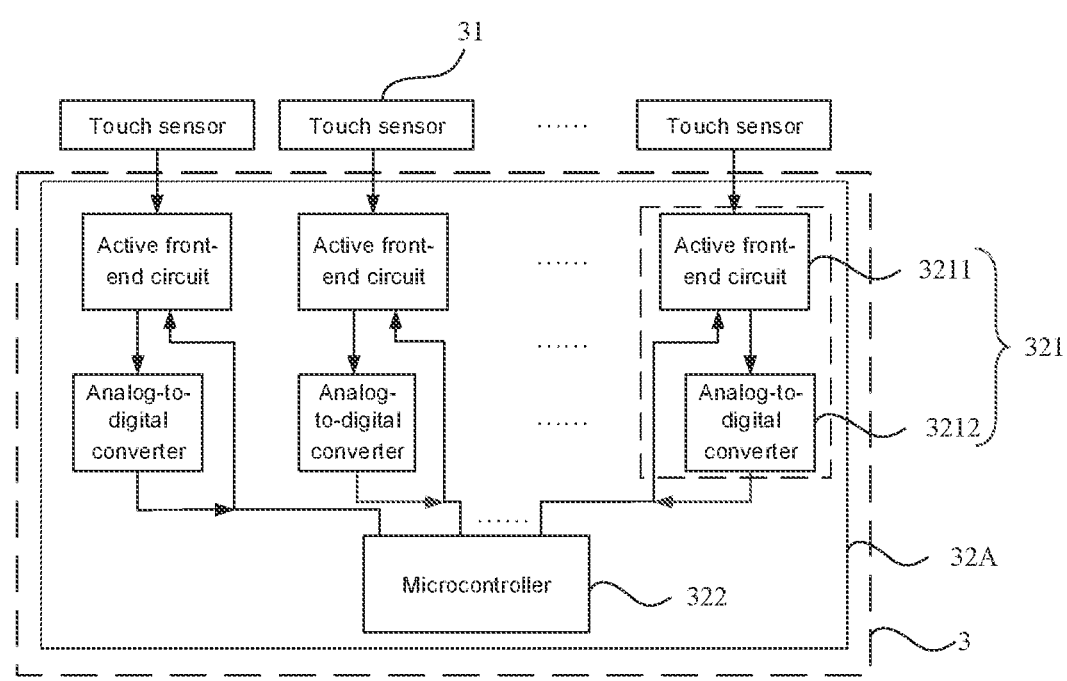
FIG. 7 is a block diagram of yet another touch display device, in accordance with some embodiments.

The signal collector 321 has functions as described above, and the specific structure thereof may be various. In some examples, referring to FIG. 7, the signal collector 321 includes an active front end (AFE) circuit 3211 and an analog-to-digital converter 3212. The analog-to-digital converter 3212 is coupled to the microcontroller 322. The AFE circuit 3211 is coupled to the analog-to-digital converter 3212, at least one touch sensor 31, and the microcontroller 322.

The AFE circuit 3211 is configured to scan at least one touch sensor 31 (e.g., multiple touch sensors 31) in the reference scan region according to the first control instruction to receive at least one initial touch signal (e.g., analog signal); transmit the initial touch signal to the analog-to-digital converter 3212; scan at least one touch sensor 31 (e.g., multiple touch sensors 31) in the current target scan region according to the second control instruction to receive at least one current touch signal (e.g., analog signal); and transmit the current touch signal to the analog-to-digital converter 3212.

The AFE circuit 3211 may have various structures, which are selected and determined according to actual needs, and are not limited in the embodiments of the present disclosure. In some examples, the AFE circuit 3211 is a circuit with a signal amplification function. For example, the AFE circuit 3211 includes a circuit element with a signal amplification function, such as an amplifier (e.g., an operational amplifier). In this way, it may help to reduce an interference of noise on the initial trigger signal or the current trigger signal, improve the signal-to-noise ratio, and reduce the difficulty of data processing by the microcontroller 322.

The analog-to-digital converter 3212 is configured to convert an analog signal transmitted by the AFE circuit 3211 into a digital signal, and transmit the digital signal to the microcontroller 322.

Figure 8:
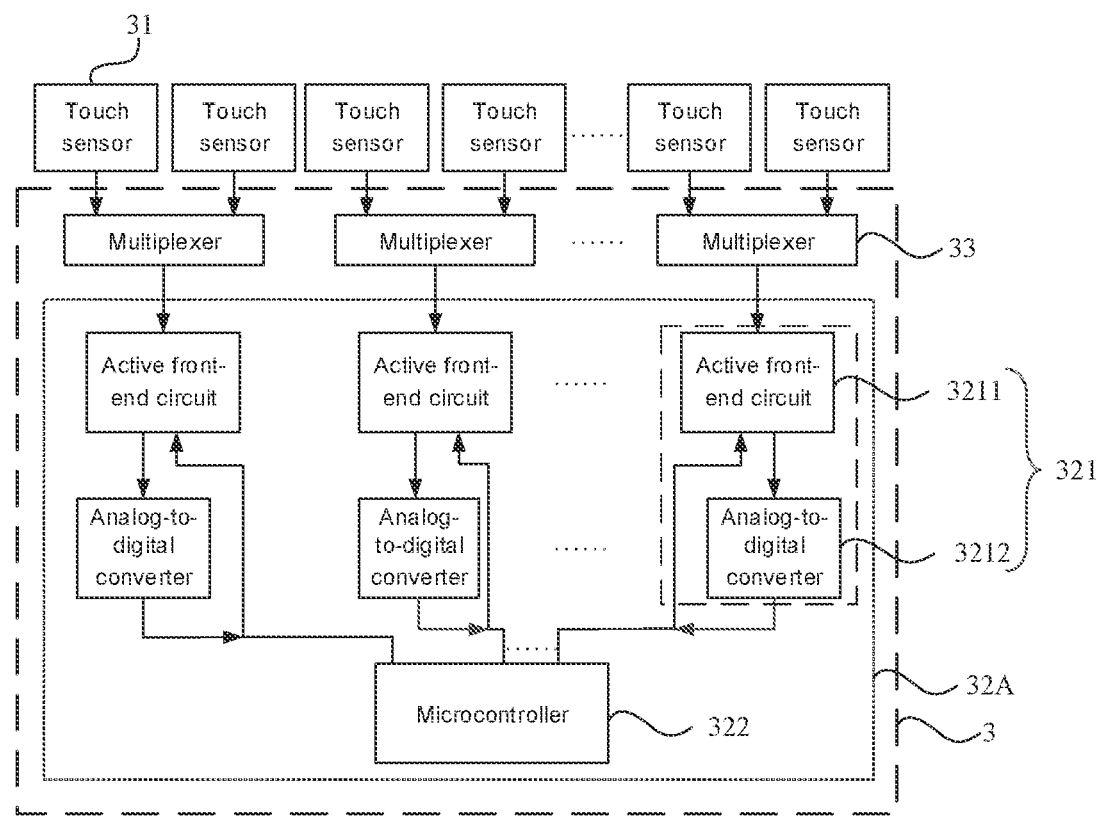
FIG. 8 is block diagram of yet another touch display device, in accordance with some embodiments.

There may be a plurality of coupling manners between the signal collector 321 and the at least one touch sensor 31. In some examples, referring to FIGS. 6 and 8, a signal collector 321 is coupled to multiple touch sensors 31. For example, the touch detection device 3 further includes at least one multiplexer (MUX) 33. The signal collector 321 is coupled to the multiple touch sensors 31 through the multiplexer 33. In some other examples, referring to FIGS. 5 and 7, each signal collector 321 is coupled to a respective touch sensor 31. That is, one signal collector 321 is coupled to one touch sensor 31. In this case, the signal collectors 321 may synchronously scan the signals at touch sensors 31 in any reference scan region or target scan region. In this way, it is possible to further shorten the time of a single scan, improve the touch response speed, and enhance the point reporting rate.

Figure 9:
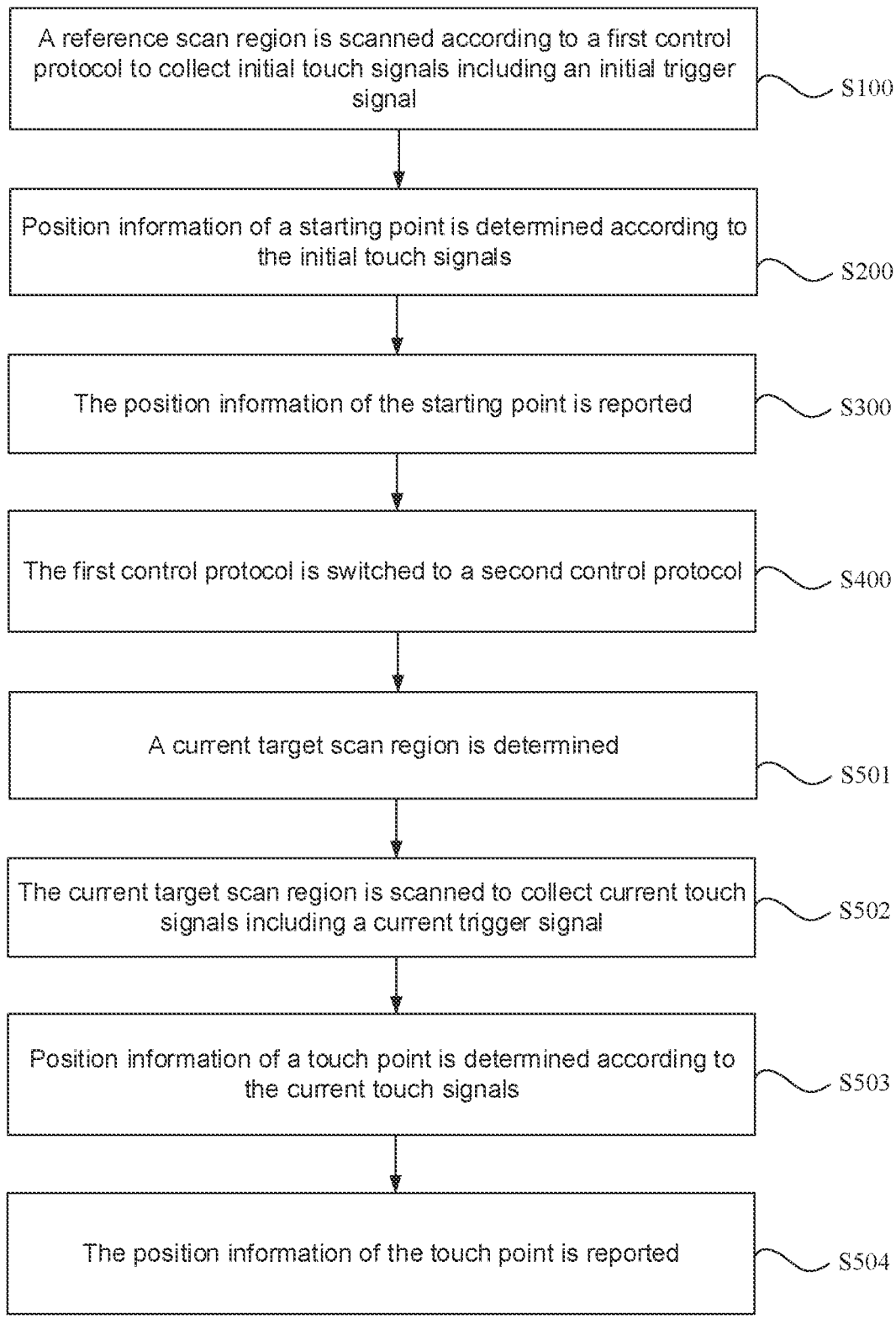
FIG. 9 is a flow diagram of a touch detection method, in accordance with some embodiments.

Some embodiments of the present disclosure provide a touch detection method. The touch detection method may be performed at a touch detection device, such as the touch detection device 3 described in any of the above embodiments. Referring to FIG. 9, the touch detection method includes the following steps.

In S100, a reference scan region is scanned according to a first control protocol to collect initial touch signals including an initial trigger signal.

Figure 5:
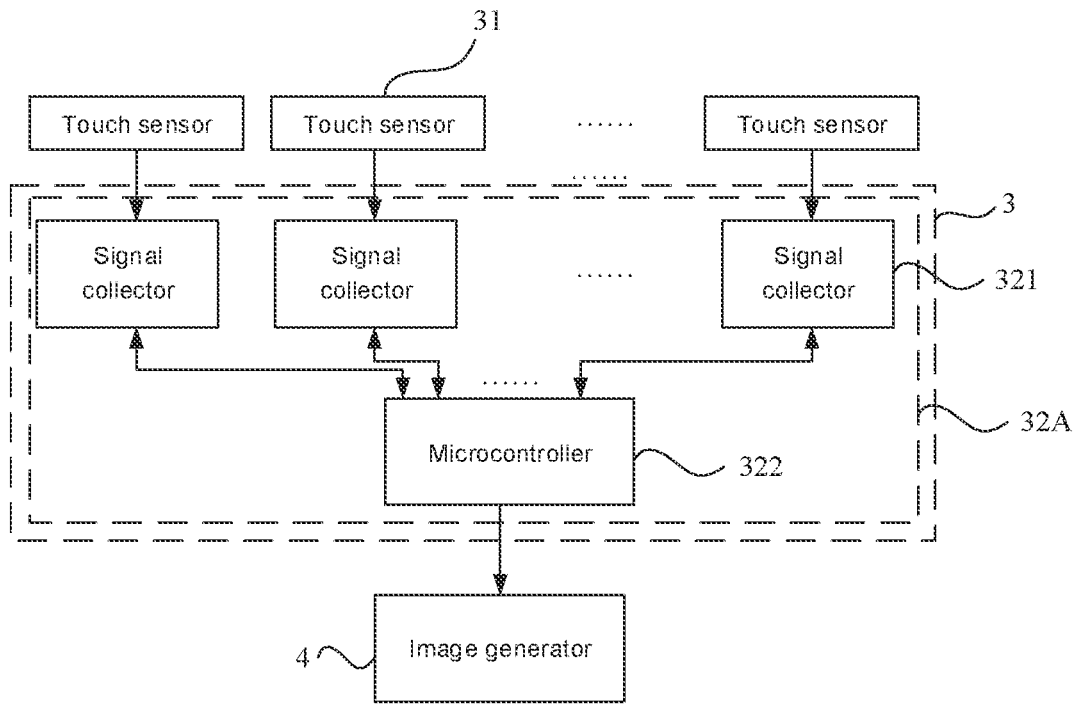
FIG. 5 is a block diagram of yet another touch display device, in accordance with some embodiments.
Figure 6:
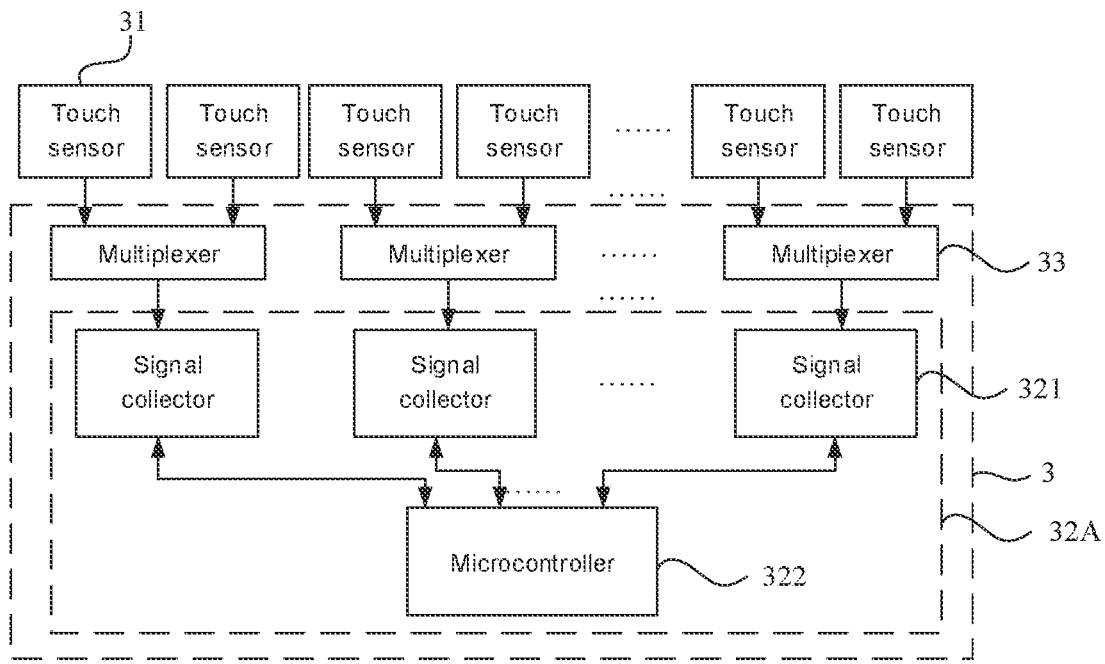
FIG. 6 is a block diagram of yet another touch display device, in accordance with some embodiments.

For example, referring to FIG. 5, the first control protocol may be pre-stored in the microcontroller 322 of the processor 32A. The microcontroller 322 may first send a first control instruction to signal collectors 321 (e.g., signal collectors 321 that are coupled to touch sensors 31 in the reference scan region, and may be part of or all the signal collectors 321 included in the processor 32A) according to the first control protocol. The signal collectors 321 may collect touch signals at the touch sensors 31 in the reference scan region according to the first control instruction.

The initial touch signals including the initial trigger signal may be used as a basis for determining position information of a starting point of a current touch task. For example, the initial trigger signal is used to trigger the current touch task.

The area of the reference scan region may be relatively large, so that the initial trigger signal may be obtained in a timely and accurate manner. For example, the area of the reference scan region is equal to an area of a touchable region of the display panel 2. For another example, the area of the reference scan region is equal to an area of a display area in the display panel 2.

In some examples, the first control protocol may be a control protocol in the field. For example, the first control protocol has a same type as a control protocol between a host and a touch IC.

In S200, position information of a starting point is determined according to the initial touch signals.

For example, referring to FIG. 5, after receiving an initial touch signal, each signal collector 321 transmits the initial touch signal to the microcontroller 322. Then, the microcontroller 322 determines the position information of the starting point according to initial touch signals transmitted by multiple signal collectors 321, i.e., according to an initial trigger signal included in the initial touch signals transmitted by the multiple signal collectors 321. For example, the microcontroller 322 may determine the position information of the starting point according to the position of the touch sensor 31 corresponding to the initial trigger signal.

In S300, the position information of the starting point is reported.

For example, referring to FIG. 5, the microcontroller 322 transmits the position information of the starting point to an image generator 4.

In S400, the first control protocol is switched to a second control protocol.

For example, the second control protocol is also pre-stored in the microcontroller 322. For example, the microcontroller 322 switches the first control protocol to the second control protocol while reporting the position information of the starting point.

In some examples, the initial trigger signal included in the initial touch signals is generated in response to a trigger event. For example, the trigger event is a touch event. That is, the initial trigger signal may be generated in response to the touch event. For another example, the trigger event is a hover event. That is, the initial trigger signal may be generated in response to the hover event. In this way, the touch detection method may determine and report the position information of the starting point through prediction, and advance the time of all subsequent point reporting in the current task, thereby further improving the touch effect of the touch display device. For example, the line followability in the process of drawing the picture through touch may be further improved.

It will be noted that, the touch display device 01 may or may not display an image according to the reported starting point, which may be selected and determined according to actual needs and is not limited in the embodiments of the present disclosure.

In some examples, the initial trigger signal is generated in response to the touch event, the image generator 4 processes the received position information of the starting point to generate image information, and transmits the image information to the screen driving board 5. The screen driving board 5 transmits data signals (e.g., data voltages Vdata) to the display panel 2 according to the image information. The display panel 2 displays an image according to the data signals. That is, the touch display device 01 may display the image according to the starting point.

In some other examples, if the initial trigger signal is generated in response to the hover event, the touch display device 01 may not display the image, That is, the reported starting point may not be used to cause the touch display device 01 to display the image.

Then, S501 to S504 are performed at least once, such as once, twice, or more times.

In S501, a current target scan region is determined.

Referring to FIGS. 17A to 17D, an area of the current target scan region is less than an area of the reference scan region, and a geometric center point of the current target scan region is the starting point or a previous touch point determined in a previous scan, For example, a position of the current target scan region is determined by using the starting point or the touch point determined in the previous scan as the geometric center point of the current target scan region.

In some examples, referring to FIG. 5, the microcontroller 322 determines a first current target scan region. For example, the microcontroller 322 determines the first current target scan region by using the starting point determined according to the initial touch signals as the geometric center point of the first current target scan region.

In S502, the current target scan region is scanned to collect current touch signals including a current trigger signal.

For example, referring to FIG. 5, the microcontroller 322 sends a second control instruction to at least one signal collector 321 (i.e., signal collector 321 corresponding to the current target scan region). The at least one signal collector 321 receives first current touch signals from touch sensors 31 in the first current target scan region according to the second control instruction, and transmits the first current touch signals to the microcontroller 322.

In S503, position information of a touch point is determined according to the current touch signals.

For example, the microcontroller 322 determines position information of the first touch point according to the first current touch signals. For example, the microcontroller 322 compares the first current touch signals with respective reference signals to obtain a first trigger signal, and determines the first touch point according to the position of the touch sensor 31 corresponding to the first trigger signal, thereby determining the position information of the first touch point.

In S504, the position information of the touch point is reported.

For example, the microcontroller 322 reports the position information of the first touch point. In this case, the microcontroller 322 may report the position information of the first touch point to the image generator 4 to facilitate a display of an image.

In addition, the microcontroller 322 may determine a second current target scan region with the first touch point as the geometric center point of the second current target scan region, and send, according to the second control protocol, the second control instruction to at least one signal collector 321 corresponding to the second current target scan region, The at least one signal collector 321 collects second current control signals at touch sensors 31 in the current second target scan region according to the second control instruction, and transmits the second current touch signals to the microcontroller 322. The microcontroller 322 determines and reports position information of a second touch point according to the second current touch signals.

By analogy, the microcontroller 322 uses an Nth touch point determined in an N-th current target scan region as a geometric center point to determine an (N+1)-th current target scan region, and sends, according to the second control protocol, the second control instruction to at least one signal collector 321 corresponding to the (N+1)-th current target scan region. The at least one signal collector 321 collects (N+1)-th current touch signals at touch sensors 31 in the (N+1)-th current target scan region according to the second control instruction, and transmits the (N+1)-th current touch signals to the microcontroller 322, where N is an integer greater than or equal to 2. The microcontroller 322 determines and reports position information of an (N+1)-th touch point according to the (N+1)-th current touch signals.

That is, each current target scan region is scanned to obtain corresponding current touch signals. Position information of a corresponding touch point is determined and reported according to the current touch signals. In addition, the touch point is used as a geometric center point to determine a next current target scan region to be scanned. These processes are repeated until the end of the task.

For example, the area of the current target scan region is less than the area of the reference scan region. That is, compared with a process of performing the scan according to the first control protocol, in a process of performing the scan according to the second control protocol, an area of a region in each scan is reduced, so that an amount of data corresponding to each scan may be reduced. In this way, according to the second control protocol, the amount of data subsequently processed and transmitted by the processor may be reduced accordingly, so that a response duration of each point reporting may be shortened, and the point reporting rate may be improved.

In the touch detection method provided by the embodiments of the present disclosure, the area of the current target scan region is less than the area of the reference scan region, so that time of a single scan under the second control protocol and processing time of related data in the subsequent process may be effectively shortened.

For the touch detection method in the embodiments of the present disclosure, after being triggered by the initial trigger signal, a protocol with a slower touch response speed (i.e., the first control protocol) may be switched to another protocol with a faster touch response speed (i.e., the second control protocol), and touch-control point reporting is performed under the another protocol all the time until the end of the task. In this way, compared to a manner of performing each touch-control point reporting through the full-screen scan, the touch detection method in the embodiments of the present disclosure may complete more times of scanning and point reporting within the same time, which may effectively improve the touch response speed and the point reporting rate, thereby improving the user experience.

In addition, for each touch point reporting in the embodiments of the present disclosure, the signals collected and processed by the processor according to the second control protocol corresponds to signals from touch sensors in the current target scan region. Therefore, compared to a manner of reporting points through the full-screen scan, the embodiments of the present disclosure may significantly reduce the amount of data collected and processed by the processor, thereby effectively reducing power consumption of the touch display device.

Figure 10:
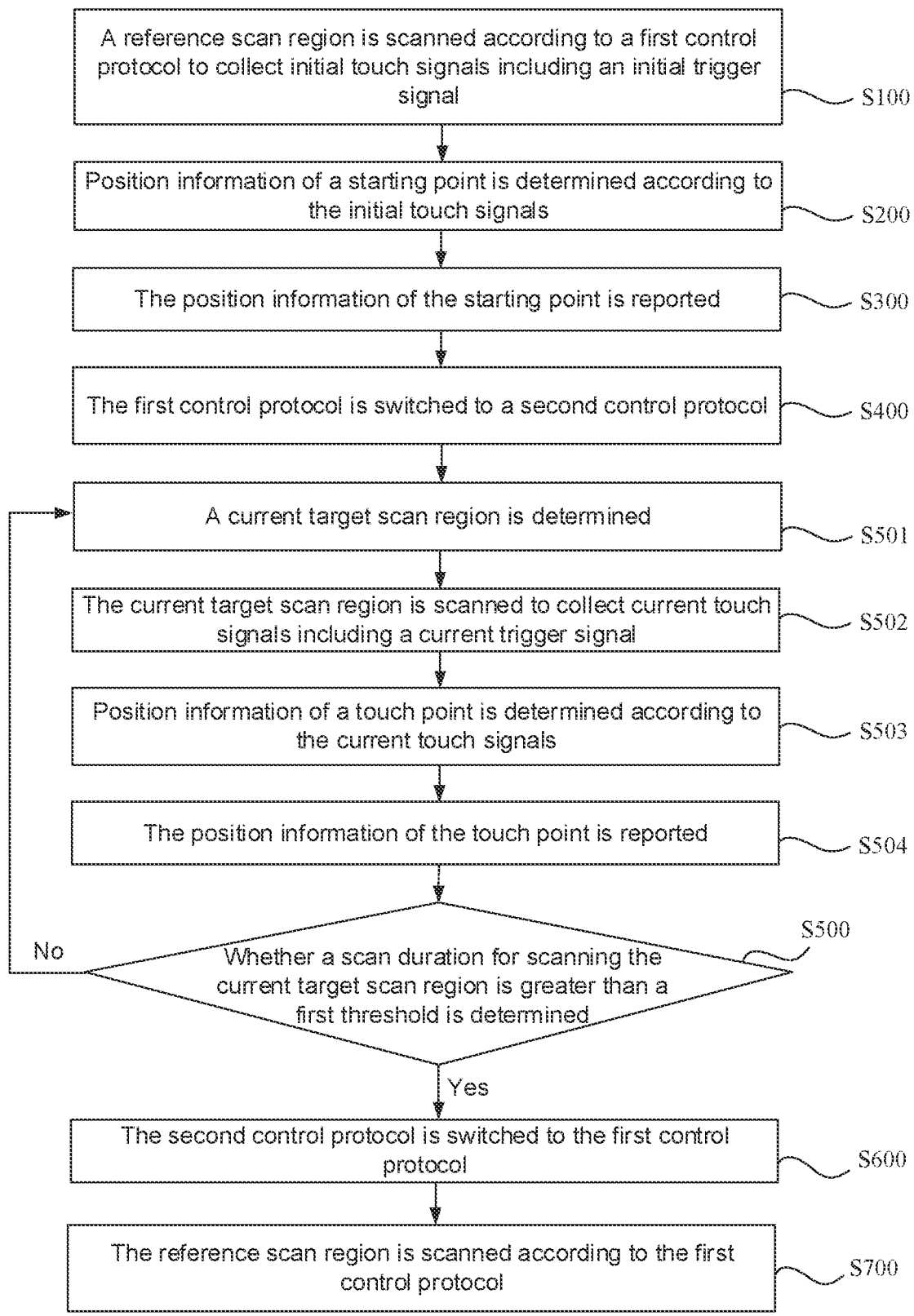
FIG. 10 is a flow diagram of another touch detection method, in accordance with some embodiments.

In some embodiments, referring to FIG. 10, the touch detection method further includes: S500, determining whether a scan duration for scanning the current target scan region is greater than a first threshold; if the scan duration is greater than the first threshold, performing S600 (i.e., switching the second control protocol to the first control protocol), and S700, scanning the reference scan region according to the first control protocol; and if the scan duration is less than or equal to the first threshold, continually performing S501 to S504.

For example, referring to FIG. 5, the microcontroller 322 determines a current target scan region, and controls, according to the second control protocol, the signal collector(s) 321 to scan touch sensors 31 in the current target scan region to collect the current control signals. If a scan duration during which current touch signals including a current trigger signal are collected by scanning the current target scan region is less than or equal to the first threshold, then it is determined that the current task is not over, and the scan is continued to be performed according to the second control protocol. If when the scan duration reaches and becomes greater than the first threshold, the microcontroller 322 has not received the current trigger signal, that is, if in the scan duration less than or equal to the first threshold, the microcontroller 322 does not receive the current trigger signal, it is determined that the task is over. In this case, the microcontroller 322 switches the second control protocol to the first control protocol, so as to control the signal collector 321 to collect initial touch signals including an initial trigger signal of the next task in the reference scan region.

The first threshold herein is a duration value. In some examples, the first threshold may be pre-set by the touch detection device 3. For example, the first threshold is pre-stored in the microcontroller 322, so that the microcontroller 322 determines whether the task is over according to the first threshold. A magnitude of the first threshold may be selected and determined according to actual conditions, which is not limited in the embodiments of the present disclosure. For example, the first threshold may be equal to or approximately equal to 80 ms.

In some embodiments, performing S501 to S504 at least once includes: using the starting point determined according to the initial trigger signal as the geometric center point to determine a first current target scan region; scanning the first current target scan region according to the second control protocol to collect first current touch signals including a first current trigger signal; determining position information of a first touch point according to the first current touch signals; and reporting the position information of the first touch point.

In addition, performing S501 to S504 at least once further includes: using the first touch point determined in the first current target scan region as a geometric center point to determine a second current target scan region; scanning the second current target scan region according to the second control protocol to collect second current touch signals including a second current trigger signal; determining position information of a second touch point according to the second current touch signals; reporting the position information of the second touch point; until using an N-th touch point determined in an N-th current target scan region as the geometric center point to determine an (N+1)-th current target scan region, so as to collect (N+1)-th current touch signals including an (N+1)-th current trigger signal, and N being an integer greater than or equal to 2; determining position information of an (N+1)-th touch point according to the (N+1)-th current touch signals; and reporting the position information of the (N+1)-th touch point.

A shape of the current target scan region may be various. For example, the shape of the current target scan region is a regular shape, such as a circle, a square, a rectangle, a trapezoid, or a hexagon. For another example, the shape of the current target scan region is an irregular shape.

For example, the shape of the current target scan region is a regular shape, and the starting point or touch point may be regarded as the geometric center point of the current target scan region. For another example, the shape of the current target scan region is an irregular shape, and the starting point or touch point may be approximately regarded as the geometric center point of the current target scan region. For another example, the shape of the current target scan region is regular or irregular, and the starting point or touch point may be regarded as the geometric gravity center of the current target scan region.

For example, with the starting point as a center of a circle, a circular region is determined as the first current target scan region. With the touch point determined in the first current target scan region as a center of a circle, a circular region is determined as the second current target scan region. With the touch point determined in the N-th current target scan region as a center of a circle, a circular region is determined as the (N+1)-th current target scan region. An area of each current target scan region may be the same or may be different.

For example, with the starting point as the center, a square region is determined as the first current target scan region. With the touch point determined in the first current target scan region as a center, a square region is determined as the second current target scan region. With the touch point determined in the N-th current target scan region as a center, a square region is determined as the (N+1)-th current target scan region. The area of each current target scan region may be the same or may be different.

In addition, a size of the area of the current target scan region may be selected and determined according to actual needs, which is not limited in the embodiments of the present disclosure. For example, the area of the current target scan region is 16 mm² to 25 mm². For example, it may be 18 mm², 20 mm², or 24 mm². For example, the shape of the current target scan region is a square, and the area of the current target scan region may be 4 mm by 4 mm to 5 mm by 5 mm. That is, a side length of the current target scan region is 4 mm to 5 mm.

In some examples, multiple touch sensors are included in the current target scan region, and the number of the touch sensors may be 100 to 169. For example, the touch sensors in the current target scan region are arranged in an array, and the number of touch sensors may be 10×10 to 13×13. That is, the number of touch sensors in a row may be 10 to 13, and the number of touch sensors in a column may be 10 to 13.

Figure 14:
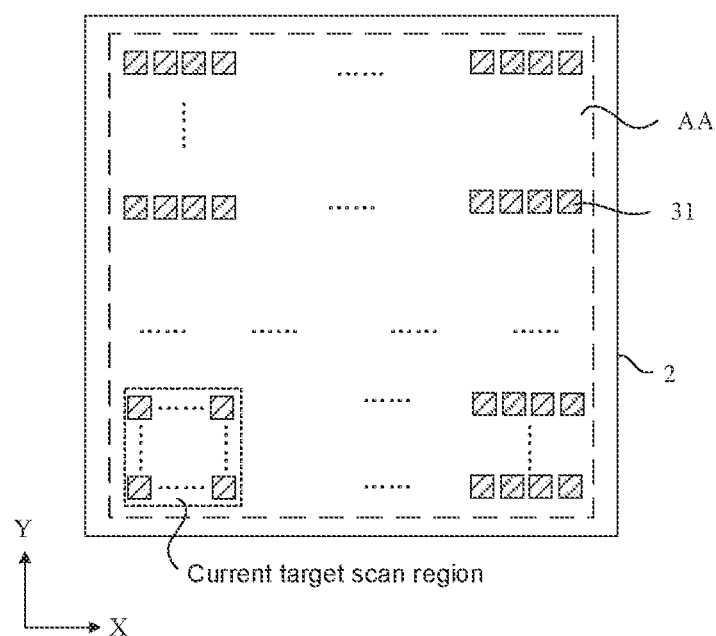
FIG. 14 is a schematic diagram of another touch display device, in accordance with some embodiments.

For example, referring to FIG. 14, the number of touch sensors included in the current target scan region is 10×10, i.e., 100 (10×10=100), and 4032 touch sensors (e.g., arranged in an array of 48 rows and 84 columns) are disposed in the entire display area AA of the touch display device (e.g., a computer). In this case, the amount of data (or the number of signals) scanned, processed, and transmitted by the touch detection device for each point reporting is approximately one fortieth of full-screen data amount (or the number of signals). Therefore, compared with a case where the touch detection device performs the full-screen scan, a case where the touch detection device scans the current target scan region may increase the point reporting rate by nearly 40 times.

For example, the number of touch sensors included in the current target scan region is 10×10, i.e., 100 (10×10=100), and 568 touch sensors are disposed in the entire display area AA of the touch display device (e.g., a mobile phone). In this case, the amount of data of scanned, processed, and transmitted by the touch detection device for each point reporting is approximately one fifth of the full-screen data amount. Therefore, compared with the case where the touch detection device performs the full-screen scan, the case where the touch detection device scans the current target scan region may increase the point reporting rate by nearly 5 times.

In this case, compared with the case where the touch detection device performs the full-screen scan, the case where the touch detection device scans the current target scan region may increase the point reporting rate by 5 to 40 times.

In addition, a magnitude of the point report rate is not only related to the area of the current target scan region, but also related to a process capability (including response speed) of related hardware, such as the active front end circuit.

In some examples, a response speed of the AFE circuit 3211 is 80 µs to 100 µs; in a case where the current target scan region is small enough, the AFE circuit 3211 may need at least 80 µs to 100 µs to complete a scan; a refresh frequency of the touch display device may be 60 Hz; and one-frame time includes 33 time periods. That is, a duration of each time period is approximately 505 ms. According to the response speed of the AFE circuit 3211, the touch detection device 3 may complete 5 to 6 times of scanning and point reporting within one time period. As described above, in the process of performing a full-screen scan, the touch display device 3 may only complete one scanning and point reporting within one time period. Therefore, compared with the point reporting rate in a case where the touch detection device performs the full-screen scan, the point reporting rate in a case where the touch detection device scans the current target scan region may be increased by nearly 5 to 6 times.

In some embodiments, one-frame time includes at least one scan period and a correction period after the at least one scan period. The touch detection method further includes: within the correction period of the current frame time, determining a signal-to-noise ratio of at least one trigger signal collected in the current frame time; determining whether the signal-to-noise ratio is greater than a second threshold; if the signal-to-noise ratio is less than or equal to the second threshold, correcting the number of scans in each scan period in the next frame time of the current frame time, For example, the number of the at least one trigger signal collected in the current frame time is one, In this case, one trigger signal is collected by scanning the current target scan region in the current frame time. For example, the microcontroller 322 compares the at least one touch signal with a respective reference signal (e.g., a touch signal sensed by a touch sensor 31 at a position where no touch occurs), and obtains a touch signal with a larger difference from the respective reference signal, that is, a trigger signal.

For example, the at least one trigger signal collected in the current frame time includes multiple trigger signals. In this case, the signal-to-noise ratio of the at least one trigger signal collected in the current frame time is an average of signal-to-noise ratios of the multiple trigger signals.

In the scan period(s), the touch detection device 3 performs the touch point reporting according to the touch detection method described in some of the above embodiments. For example, one-frame time includes one or more scan periods, which is selected and determined according to actual needs, and is not limited in the embodiments of the present disclosure. For example, one-frame time includes three scan periods.

In the correction period of the current frame time, the microcontroller 322 determines whether the number of scans in each scan period in the subsequent frame time needs to be corrected by taking whether the signal-to-noise ratio of the trigger signal collected in the current frame time is greater than the second threshold as the standard. If the signal-to-noise ratio is greater than the second threshold, it is determined that the signal-to-noise ratio reaches the standard, and the number of scans in each scan period in the subsequent frame time remains unchanged. If the signal-to-noise ratio is less than or equal to the second threshold, it is determined that the signal-to-noise ratio fails to reach the standard, and the number of scans in each scan period in the subsequent frame time is corrected. For example, the number of scans in each scan period in the subsequent frame time is properly adjusted to be lower to ensure that the signal-to-noise ratio of the trigger signal collected in the subsequent frame time reaches the standard.

Here, the second threshold is a value of a signal-to-noise ratio. The value of signal-to-noise ratio is used to determine whether the signal-to-noise ratio of the trigger signal collected in the current frame time reaches the standard, so as to ensure a good touch effect. A magnitude of the second threshold may be selected and determined according to actual conditions, which is not limited in the embodiments of the present disclosure. For example, the second threshold is within a range from −40 dB to −30 dB, such as −40 dB, −35 dB, or −30 dB.

In some examples, the second threshold is pre-set by the touch detection device 3. For example, the second threshold is pre-stored in the microcontroller 322.

In the touch detection method in the embodiments of the present disclosure, the signal-to-noise ratio of the trigger signal is compared with the second threshold in the correction period of the current frame time, which may improve the signal-to-noise ratio of the trigger signal in the subsequent frame time by decreasing the number of scans in the scan period when the signal-to-noise ratio is less than or equal to the second threshold, thereby ensuring a good touch effect of the touch display device.

In this case, after the above correction, the total number of scans performed in at least one scan period in the subsequent frame time may be different from the total number of scans performed in at least one scan period in the previous frame time before correction. In some embodiments, the total number of scans in each frame time is set to be the same, so as to effectively ensure stability of the point reporting rate of the touch display device.

In some embodiments, the touch detection method further includes: within the correction period of the current frame time, determining whether the number of scans completed in the current frame time is equal to the total number of scans performed in the previous frame time of the current frame time; if the number of scans completed in the current frame time is less than the total number of scans performed in the previous frame time of the current frame time, in the correction period in the current frame time, continuing to perform the scan according to the current first control protocol or second control protocol to correct the number of scans in the current frame time.

For example, the microcontroller 322 determines whether the number of scans completed in the current frame time is equal to the total number of scans performed in the previous frame time of the current frame time within the correction period of the current frame time. If the microcontroller 322 determines that the number of scans completed in the current frame time is reduced by 2 compared with the total number of scans performed in the previous frame time, the microcontroller 322 controls signal collector(s) 321 to continue to perform two scans in the correction period according to the current control protocol, so as to ensure that the number of scans completed in the current frame time is equal to the total number of scans performed in the previous frame time of the current frame time. In this way, it is possible to effectively ensure that the total number of scans performed in each frame time is the same while the signal-to-noise ratio of the trigger signal reaches the standard, thereby maintaining the stability of the point reporting rate and ensuring a good touch effect.

In some embodiments, during the current frame time of performing the scan according to the second control protocol, the control detection method further includes: within the correction period of the current frame time, determining whether the number of actual reports of position information reported in the current frame time is less than a third threshold (e.g., the number of reports that should be done); if the number of actual reports is less than the third threshold, continuing to perform the scan according to the second control protocol within the correction period of the current frame time; and reporting the position information of the touch point to correct the number of actual reports of the position information reported in the current frame time.

In some examples, the microcontroller 322 determines whether the number of actual reports of the position information reported in the current frame time is less than the number of reports that should be done within the correction period of the current frame time, For example, within the correction period of the current frame time, the microcontroller 322 determines whether a packet loss event occurs in the current frame time according to the number of actual reports and the number of reports that should be done. If the microcontroller 322 determines that the number of actual reports of the position information reported in the current frame time is less than the number of reports that should be done, the microcontroller 322 controls signal collector(s) 321 to continue to perform two scans according to the second control protocol in the correction period of the current frame time; and reports the position information of the touch points to correct the number of actual reports in the current frame time, so that the final number of actual reports in the current frame time is equal to the number of reports that should be done.

In this way, it is possible to maintain the stability of the number of actual reports through the correction in the correction period in each frame time. That is, the stability of the point reporting rate may be maintained, thereby effectively ensuring the stability of the touch effect.

In order to illustrate the touch detection method in the embodiments of the present disclosure more clearly, embodiments are described in detail below.

Figure 11:
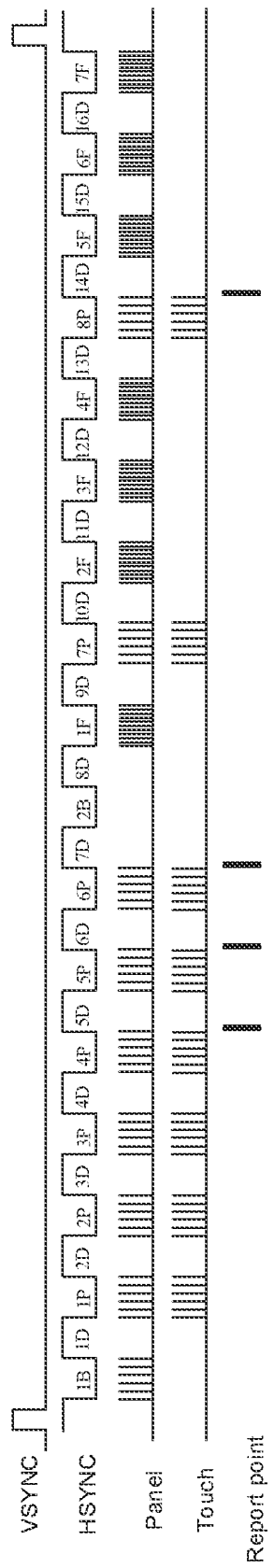
FIG. 11 is a schematic diagram of a first control protocol, in accordance with some embodiments.
Figure 12:
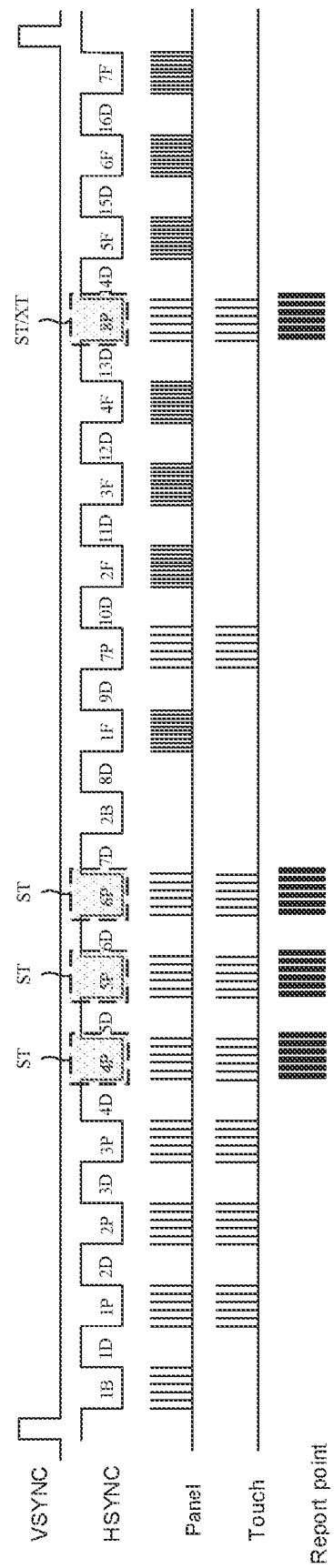
FIG. 12 is a schematic diagram of a second control protocol, in accordance with some embodiments.

It will be noted that, in the following embodiments, description is made by taking an example in which the touch display device is a touch display device including an in-cell touch display panel, and a refresh frequency of the in-cell touch display panel is 60 Hz. Referring to FIGS. 11 and 12, the term "Panel" represents the touch display panel, for example, the above-mentioned display panel 2. A time interval between two adjacent pulses of a vertical synchronization signal (VSYNC) corresponds to one-frame time. A pulse width in a horizontal synchronization pulse (HSYNC) corresponds to a display period, and a time interval between any two adjacent pulse widths corresponds to a touch period. As shown in FIGS. 11 and 12, each frame time includes 33 time periods. Sixteen time periods numbered with the letter D are configured as display periods, and a total of 17 time periods numbered with the letter B, P, or F are configured as touch periods. In addition, the display periods and the touch periods are alternatively arranged.

Among the 17 touch periods, a time period numbered 1B is configured as a time period for performing the first handshake to inform related devices in the touch display device, for example, the touch detection device to activate a touch function of a stylus. In addition, eight time periods numbered 1P, 2P, 3P, 4P, 5P, 6P, 7P, and 8P are stylus touch time periods, which are configured as time periods for implementing the touch function in a stylus touch mode. For example, the time period numbered 1P is configured as a time period for confirming a model, a pen ring, and an aware interface of the stylus. The time period numbered 2P is configured as a time period for confirming a header and parity bits. The time period numbered 3P is configured as a time period for confirming pressure and the parity bits. Four time periods numbered 4P, 5P, 6P, and 8P are configured as time periods for performing the scan and point reporting of the corresponding trigger signal, i.e., a scan period ST. The time period numbered 4P may also be configured as a time period for confirming the pressure and the parity bits. The time period numbered 5P may also be configured as a time period for confirming a hover or contact state and the parity bits. The time periods numbered 6P may also be configured as a time period for confirming the parity bits. The time period numbered 7P is configured as a time period for confirming the hover or contact state, pressure, and the parity bits. The time period numbered 8P may also be configured as a time period for confirming the hover or contact state and the parity bits. In addition, the time period numbered 2B is configured to determine a noise signal, so as to improve the touch effect of the subsequent touch process. For example, subsequent related touch data is corrected according to the noise signal, thereby ensuring a good touch effect. Seven time periods numbered 1F, 2F, 3F, 4F, 5F, 6F, and 7F are finger touch time periods, which are configured as time periods for implementing the touch function in a finger touch mode.

For example, the touch detection method is applied to the stylus touch mode. The touch detection method of the touch display device in the stylus touch mode (e.g., an active pen touch mode) is as follows.

For example, according to the first control protocol shown in FIG. 11, the microcontroller 322 sends the first control instruction to corresponding signal collectors 321. According to the first control instruction, the signal collectors 321 scan signals at touch sensors in the entire display area (i.e., the reference scan region) in the scan periods ST (including four time periods numbered 4P, 5P, 6P, and 8P), so as to collect initial touch signals including an initial trigger signal. Then, the signal collectors 321 transmits the collected initial touch signals including the initial trigger signal to the microcontroller 322. For example, the signal collectors 321 collect the initial touch signals in the time period numbered 6P and transmits them to the microcontroller 322. In this case, the microcontroller 322 determines and reports the position information of the starting point to the image generator 4 according to the initial touch signals, and switches the first control protocol to the second control protocol.

For example, the initial trigger signal is generated in response to a trigger event (e.g., a touch event). The image generator 4 processes the received position information of the starting point to generate image information, and transmits the image information to the screen driving board 5. The screen driving board 5 transmits data signals (e.g., data voltages Vdata) to the display panel 2 according to the image information. The display panel 2 displays an image according to the data signals. For example, when the initial trigger signal is generated in response to the hover event, the reported starting point does not cause the touch display device to display the image.

Here, according to the first control protocol, the touch detection device may complete one full-screen scan in one scan period ST. For example, before collecting the initial trigger signal, the microcontroller 322 controls the signal collectors 321 to continuously scan the entire display area until the initial trigger signal is collected.

For example, as shown in FIG. 14, the microcontroller 322 determines a square region as the first current target scan region with the starting point as a center. For example, there are 10×10, i.e., 100 touch sensors 31 disposed in the first current target scan region. The microcontroller 322 sends the second control instruction to signal collectors 321, and controls the signal collectors 321 to scan the signal at touch sensors 31 in the first current target scan region in the subsequent adjacent one scan period ST, i.e., the time period numbered 8P, to obtain first current touch signals including a first current trigger signal (i.e., the current trigger signal). The signal collectors 321 transmit the collected current touch signals to the microcontroller 322.

Further, the microcontroller 322 determines the position information of the first touch point according to the first touch signals. Then, the microcontroller 322 reports the position information of the first touch point to the image generator 4, so that the display panel 2 displays the corresponding image. In addition, the microcontroller 322 uses the first touch point as the center to determine a square region as a second current target scan region. For example, an area of the second current target scan region is equal to an area of the first current target scan region.

Further, the microcontroller 322 sends the second control instruction to signal collectors 321, and controls the signal collectors 321 to scan the signal at touch sensors 31 in the second current target scan region in the subsequent time periods to obtain second current touch signals including a second current trigger signal (i.e., a next current trigger signal of the first current trigger signal). Here, the subsequent periods include a remaining duration of the time period numbered 8P of the current frame time and each scan period ST in the subsequent frame time. By analogy, the microcontroller 322 determines the position information of a touch point according to collected corresponding current touch signals including a corresponding current trigger signal.

Then, the touch point is used as the geometric center point to determine the next current target scan region to be scanned, and signal collectors 321 are controlled in the corresponding scan period ST to scan the touch signals at touch sensors 31 in the next current target scan region to be scanned. In addition, the position information of the touch point is reported to realize the display of a corresponding image.

Here, in one time period, the touch detection device may complete six times of scanning of current target scan regions.

For example, before the current trigger signal is not collected, the microcontroller 322 will control the signal collectors 321 to continuously scan the current target scan region, according to the second control protocol. For example, if the microcontroller 322 receives the current trigger signal in a time period less than or equal to the first threshold (e.g., 80 ms), it is determined that the current task is not over, and another scan and point reporting are continued to be performed according to the second control protocol. If the microcontroller 322 does not receive the current trigger signal in the time period less than or equal to the first threshold (e.g., 80 ms), it is determined that the task is over. In this case, the microcontroller 322 switches the second control protocol to the first control protocol, so as to control the signal collectors 321 to collect the initial trigger signal of the next task in the reference scan region.

On this basis, referring to FIG. 11, in a case where the touch display device performs the full-screen scan according to the first control protocol, the touch display device may complete four times of point reporting in four scan periods ST of one-frame time. That is, the point reporting rate is 240 Hz. In a case where the touch display device scans the current target region, the first control protocol is only used to obtain the initial trigger signal, and be switched to the second control protocol with a higher point reporting rate after the initial trigger signal is obtained. Referring to FIG. 12, according to the second control protocol, the touch display device may complete twenty-four times of point reporting in four scan periods ST of one-frame time. That is, the point reporting rate is 1440 Hz. In this way, the touch detection method in the embodiments of the present disclosure may increase the point reporting rate of the touch display device by approximately 5 times.

For example, a point reporting rate of 1000 Hz may ensure a good touch effect. According to the second control protocol, three scan periods ST are set in one-frame time, and then the point reporting rate may reach 1060 Hz. In this case, for example, three time periods numbered 4P, 5P, and 6P in each frame time are set as the scan periods ST: and the time period numbered 8P in each frame time is set as a correction period XT. In the correction period XT, the touch detection device performs corresponding operations to further ensure and improve the touch performance of the stylus of the touch display device.

For example, in the time period numbered 8P, the microcontroller 322 determines the signal-to-noise ratio of all trigger signals collected in the current frame time, and determine whether the signal-to-noise ratio is greater than the second threshold. If the signal-to-noise ratio is less than or equal to the second threshold, the number of scans in each scan period ST in the next frame time of the current frame time is corrected. For example, in a case where the signal-to-noise ratio is less than or equal to the second threshold, the number of scans in each scan period ST is adjusted from 6 to 5, so that the signal-to-noise ratio of the trigger signal collected in the subsequent frame time reaches the standard.

In this case, after the above adjustment, the total number of scans in each scan period ST in each subsequent frame time is changed from 18 to 15.

For example, in the time period numbered 8P, the microcontroller 322 determines whether the number of scans completed in the current frame time is less than the total number of scans, i.e., 18 scans, performed in the previous frame time of the current frame time. If the number of scans completed in the current frame time is not equal to the total number of scans performed in the previous frame time of the current frame time, then in the time period numbered 8P, three scans are continued to be performed according to the second control protocol to ensure that the total number of scans in each frame time is the same.

For example, in the time period numbered 8P, the microcontroller 322 determines whether the number of actual reports of the position information reported in the current frame time is less than the number of reports that should be done, i.e., 18. If the number of actual reports is less than the number of reports that should be done, then the scan is continued to be performed according to the second control protocol in the time period, and the position information of the corresponding touch point is reported to correct the number of actual reports of the position information reported in the current frame time. For example, the microcontroller 322 determines that the number of actual reports of position information reported in the current frame time is 16, i.e., the number of actual reports, is 2 less than the number of reports that should be done. Then according to the second control protocol, the microcontroller 322 controls signal collectors 321 to continue to perform two scans in the time period, and reports the position information of the corresponding touch point, so as to ensure that the number of actual reports of the position information reported in the current frame time is equal to 18.

It will be noted that, the scans of the initial trigger signal and the current trigger signal are completed in the scan period ST or the correction period. The report of the starting point or the touch point may be completed in the scan period ST, the correction period XT, or the display period. The report of the starting point or the touch point may be performed in real time after each scan, or may be performed in a unified manner after all scans in the current frame time are completed, which is not limited in the embodiments of the present disclosure.

Figure 13:
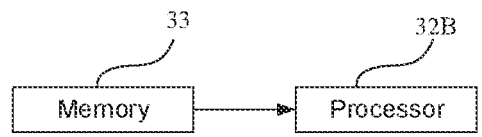
FIG. 13 is a block diagram of a touch detection device, in accordance with some embodiments.

Some embodiments of the present disclosure provide a touch detection device. As shown in FIG. 13, the touch detection device 3B includes a memory 33 and a processor 32B. The memory 33 is coupled to the processor 32B.

The memory 33 stores one or more computer programs that may be run on the processor 32B. When the processor 323 executes the computer program(s), the touch detection device implements the touch detection method as described in any of the above embodiments.

For example, the processor 32B may be one processor, or may be a collective name of a plurality of processing elements. For example, the processor 32B may be a general central processing unit (CPU), a microprocessor, an application specific integrated circuit (ASIC), or one or more integrated circuits used to control the program execution of the solution of the present disclosure, such as one or more microprocessors, or one or more field programmable gate arrays.

The memory 33 may be one memory, or may be a collective name of a plurality of storage elements, and is used to store executable program codes, etc. For example, the memory 33 may be a read-only memory (ROM) or another type of static storage device that may store static information and instructions, a random access memory (RAM), or another type of dynamic storage device that may store information and instructions, or an electrically erasable programmable read-only memory (EEPROM), a compact disc read-only memory (CD-ROM) or another compact disc storage, an optical disc storage (including a compressed disc, a laser disc, an optical disc, a digital versatile disc, or Blu-ray disc, etc), a magnetic disc storage medium or another magnetic storage device, or any other medium that may be used to carry or store a desired program code in the form of instructions or data structures and can be accessed by a computer, which is not limited thereto.

The memory 33 is used to store computer programs (e.g., application program codes) for executing the solution of the present disclosure, The processor 32B is used to execute computer programs stored in the memory 33, so as to control the touch detection device to implement the touch detection method provided by the embodiments of the present disclosure.

Some embodiments of the present disclosure provide a non-transitory computer-readable storage medium that stores one or more computer program. When the one or more computer programs are executed by the touch detection device, the touch detection device implements the touch detection method as described in any of the above embodiments. For example, the touch detection device may implement one or more steps in the touch detection method, For example, the non-transitory computer-readable storage medium may include, but is not limited to, a magnetic storage device (e.g., a hard disk, a floppy disk, or a tape), an optical disk (e.g., a compact disk (CD), and a digital versatile disk (DVD)), a smart card and a flash memory device (e.g., an erasable programmable read-only memory (EPROM), a card, a stick or a key drive). Various non-transitory computer-readable storage media described may represent one or more device, and/or other machine-readable storage media for storing information.

Some embodiments of the present disclosure provide a computer program product. The computer program product includes one or more computer programs carried on a non-transitory computer-readable storage medium. When executed on a computer, the one or more computer programs enable the touch detection device to implement the touch detection method as described in the above embodiments, for example, one or more steps in the touch detection method.

The beneficial effects of the foregoing computer-readable storage medium and the computer program product are the same as the beneficial effects of the touch detection method described in any of the above embodiments, which will not be described herein again. In the description of the above embodiments, specific features, structures, materials, or characteristics may be combined in any suitable manner in any one or more embodiments or examples.

The foregoing descriptions are merely specific implementation manners of the present disclosure, but the protection scope of the present disclosure is not limited thereto. Any changes or replacements that a person skilled in the art could conceive of within the technical scope disclosed by the present disclosure should be within the protection scope of the present disclosure. Therefore, the protection scope of the present disclosure shall be subject to the protection scope of the claims.

What claimed is:

1. A touch detection method, comprising:
scanning a reference scan region according to a first control protocol to collect initial touch signals including an initial trigger signal;
determining position information of a starting point according to the initial touch signals;
reporting the position information of the starting point;
switching the first control protocol to a second control protocol; and
performing following operations at least once:
determining a current target scan region, wherein an area of the current target scan region is less than an area of the reference scan region;
scanning the current target scan region according to the second control protocol to collect current touch signals including a current trigger signal;
determining position information of a touch point according to the current touch signals, and
reporting the position information of the touch point, wherein a geometric center point of the current target scan region is the starting point or a previous touch point that is determined in a previous scan, wherein
a frame time includes at least one scan period and a correction period after the at least one scan period; and
a plurality of scans are performed in each scan period, and the touch detection method further comprises:

determining a signal-to-noise ratio of at least one trigger signal collected in a current frame time within a correction period of the current frame time;

determining whether the signal-to-noise ratio is greater than a second threshold; and when the signal-to-noise ratio is less than or equal to the second threshold, correcting a number of scans in each scan period in a next frame time of the current frame time.

2. The touch detection method according to claim 1, wherein the initial trigger signal is generated in response to a trigger event.

3. The touch detection method according to claim 2, wherein the trigger event includes a stylus hover or a gesture hover.

4. The touch detection method according to claim 2, wherein the trigger event includes a stylus touch or a finger touch.

5. The touch detection method according to claim 1, wherein performing following operations at least once: determining a current target scan region; scanning the current target scan region according to the second control protocol to collect the current touch signals; determining position information of a touch point according to the current touch signals, and reporting the position information of the touch point, includes:

determining a first current target scan region by taking the starting point determined according to the initial touch signals as a geometric center point;

scanning the first current target scan region according to the second control protocol to collect first current touch signals including a first current trigger signal;

determining position information of a first touch point according to the first current touch signals;

reporting the position information of the first touch point;

determining a second current target scan region by taking the first touch point as a geometric center point;

scanning the second current target scan region according to the second control protocol to collect second current touch signals including a second current trigger signal;

determining position information of a second touch point according to the second current touch signals;

reporting the position information of the second touch point;

until determining an (N+1)-th current target scan region by taking an N-th touch point determined in an N-th current target scan region as a geometric center point, so as to collect (N+1)-th current touch signals including an (N+1) current trigger signal, N being an integer greater than or equal to 2;

determining position information of an (N+1)-th touch point according to the (N+1)-th current touch signals; and reporting the position information of the (N+1)-th touch point.

6. The touch detection method according to claim 1, further comprising:

determining whether a scan duration for scanning the current target scan region is greater than a first threshold;

when the scan duration is greater than the first threshold, switching the second control protocol to the first control protocol; and scanning the reference scan region according to the first control protocol to collect next initial touch signals including a next initial trigger signal.

7. The touch detection method according to claim 1, wherein the number of scans performed in each frame time is the same, and the touch detection method further comprises:

in the correction period of the current frame time, determining whether a number of scans completed in the current frame time is equal to a number of scans performed in a previous frame time of the current frame time; and when the number of scans completed in the current frame time is less than the number of scans performed in the previous frame time, continuing to perform a scan according to a current first control protocol or second control protocol in the correction period of the current frame time, so as to correct the number of scans in the current frame time.

8. The touch detection method according to claim 1, wherein a scan is performed according to the second control protocol in the current frame time, and the touch detection method further comprises:

in the correction period of the current frame time, determining whether a number of actual reports of position information in the current frame time is less than a third threshold;

when the number of actual reports is less than the third threshold, continuing to perform the scan according to the second control protocol in the correction period in the current frame time; and reporting position information of a corresponding touch point to correct the number of actual reports in the current frame time.

9. A touch detection device, comprising:

a memory storing one or more computer programs; and a processor coupled to the memory and configured to execute the one or more computer programs to cause the touch detection device to implement the touch detection method according to claim 1.

10. A non-transitory computer-readable storage medium storing a computer program that, when executed by a touch display device, causes the touch display device to implement the touch detection method according to claim 1.

11. A touch detection device, comprising:

a plurality of signal collectors configured to scan touch sensors in a reference scan region according to a first control protocol to collect initial touch signals including an initial trigger signal; and a microcontroller coupled to the plurality of signal collectors and configured to:

determine position information of a starting point according to the initial touch signals;

report the position information of the starting point; and switch the first control protocol to a second control protocol, wherein the plurality of signal collectors and the microcontroller are further configured to perform following operations at least once:

determining a current target scan region, wherein an area of the current target scan region is less than an area of the reference scan region;

scanning touch sensors in the current target scan region according to the second control protocol to collect current touch signals including a current trigger signal;

determining position information of a touch point according to the current touch signals, and reporting the position information of the touch point, wherein a geometric center point of the current target scan region is the starting point or a previous touch point that is determined in a previous scan, wherein a frame time includes at least one scan period and a correction period after the at least one scan period; and a plurality of scans are performed in each scan period, and the touch detection method comprises:

determining a signal-to-noise ratio of at least one trigger signal collected in a current frame time within a correction period of the current frame time;

determining whether the signal-to-noise ratio is greater than a second threshold; and when the signal-to-noise ratio is less than or equal to the second threshold, correcting a number of scans in each scan period in a next frame time of the current frame time.

12. The touch detection device according to claim 11, wherein the microcontroller is configured to:

send a first control instruction to signal collectors corresponding to the reference scan region according to the first control protocol;

send a second control instruction to signal collectors corresponding to the current target scan region according to the second control protocol;

determine the position information of the starting point according to the initial touch signals;

report the position information of the starting point;

switch the first control protocol to the second control protocol;

determine the position information of the touch point according to the current touch signals; and report the position information of the touch point; and each signal collector is configured to be coupled to at least one touch sensor, and the signal collectors corresponding to the reference scan region are configured to:

scan touch sensors in the reference scan region according to the first control instruction to obtain the initial touch signals; and transmit the initial touch signals to the microcontroller; and the signal collectors corresponding to the current target scan region are configured to:

scan touch sensors in the current target scan region according to the second control instruction to obtain the current touch signals, and transmit the current touch signals to the microcontroller.

13. The touch detection device according to claim 12, wherein the signal collector includes:

an analog-to-digital converter coupled to the microcontroller; and an active front end circuit coupled to the analog-to-digital converter and the microcontroller.

14. The touch detection device according to claim 12, further comprising at least one multiplexer, wherein a signal collector is configured to be coupled to part of a plurality of touch sensors through one multiplexer.

15. A touch display device, comprising:

a plurality of touch sensors;

the touch detection device according to claim 11 coupled to the plurality of touch sensors; and a host coupled to the touch detection device and configured to receive position information of the starting point or the touch point reported by the touch detection device.

16. The touch display device according to claim 15, further comprising a display panel coupled to the touch detection device, wherein the plurality of touch sensors are disposed in the display panel;

the touch detection device is configured to receive touch signals including a trigger signal generated according to a trigger event performed on the display panel.

17. The touch display device according to claim 16, further comprising:

an image generator coupled to the touch detection device and configured to receive and process position information of a touch point from the touch detection device to generate image information; and a screen driving board coupled to the image generator and the display panel, the screen driving board being configured to transmit data signals to the display panel according to the image information, wherein the display panel is configured to display an image according to the data signals.

18. The touch display device according to claim 15, wherein each signal collector is coupled to a respective one of the plurality of touch sensors.

* * * * *